(12) United States Patent
Akimoto et al.

(10) Patent No.: US 12,488,440 B2
(45) Date of Patent: Dec. 2, 2025

(54) IMAGE SYSTEM DISPLAY BRIGHT SPOT CORRECTION SYSTEM

(71) Applicant: Semiconductor Energy Laboratory Co., Ltd., Atsugi (JP)

(72) Inventors: Kengo Akimoto, Isehara (JP); Daichi Mishima, Hadano (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 545 days.

(21) Appl. No.: 17/794,698

(22) PCT Filed: Jan. 27, 2021

(86) PCT No.: PCT/IB2021/050600
§ 371 (c)(1),
(2) Date: Jul. 22, 2022

(87) PCT Pub. No.: WO2021/156708
PCT Pub. Date: Aug. 12, 2021

(65) Prior Publication Data
US 2023/0067287 A1    Mar. 2, 2023

(30) Foreign Application Priority Data

Feb. 7, 2020 (JP) .................................. 2020-020034
May 14, 2020 (JP) .................................. 2020-085322

(51) Int. Cl.
*G06T 5/77* (2024.01)

(52) U.S. Cl.
CPC ...... *G06T 5/77* (2024.01); *G06T 2207/20081* (2013.01); *G06T 2207/20084* (2013.01)

(58) Field of Classification Search
CPC ... G09G 2320/0233; G09G 2320/0242; G09G 2320/0285; G09G 2320/0295;
(Continued)

(56) References Cited

U.S. PATENT DOCUMENTS 9,754,540 B2 * 9/2017 Takesue ................ G06F 3/1438
9,785,026 B2 10/2017 Wang
(Continued)

FOREIGN PATENT DOCUMENTS

CN 105761673 A 7/2016
CN 107346653 A 11/2017
(Continued)

OTHER PUBLICATIONS

International Search Report (Application No. PCT/IB2021/050600), dated Apr. 27, 2021.
(Continued)

*Primary Examiner* — Chineyere Wills-Burns
*Assistant Examiner* — Emmanuel Silva-Avina
(74) *Attorney, Agent, or Firm* — Eric J. Robinson; Robinson Intellectual Property Law Office, P.C.

(57) ABSTRACT

An image processing system that can reduce display unevenness in an image displayed on a display device is provided. The image processing system includes a display device, an image capturing device, and a learning device. The learning device stores a table representing information on the correspondence between first image data and second image data that is generated by display of an image corresponding to the first image data on the display device and image capturing of the image by the image capturing device. The learning device generates teacher data in accordance with the table and generates a machine learning model with the use of the teacher data generated. Image processing using the machine learning model is performed on image data input to the display device, so that display unevenness in the image displayed on the display device can be reduced.

11 Claims, 17 Drawing Sheets

(58) Field of Classification Search
CPC ....... G09G 2360/148; G09G 2360/147; G09G 2360/16; G09G 3/006; G06N 3/09; G06T 2207/20084; G06T 2207/20081; G06T 2207/30121; G06T 5/60; G06T 5/90
USPC ......................................................... 382/275
See application file for complete search history.

(56) References Cited

U.S. PATENT DOCUMENTS

| | | | |
|---|---|---|---|
| 10,274,760 | B2 | 4/2019 | Lee |
| 10,976,605 | B2 | 4/2021 | Ji et al. |
| 11,037,525 | B2 | 6/2021 | Shiokawa et al. |
| 11,062,664 | B2 | 7/2021 | Li et al. |
| 2016/0189612 | A1 | 6/2016 | Lee et al. |
| 2019/0373206 | A1 | 12/2019 | Kang et al. |
| 2020/0126510 | A1* | 4/2020 | Shiokawa ............... G09G 5/003 |
| 2020/0219467 | A1* | 7/2020 | Okamoto ............... G06N 3/045 |

FOREIGN PATENT DOCUMENTS

| | | | |
|---|---|---|---|
| CN | 108596226 | A | 9/2018 |
| CN | 109272948 | A | 1/2019 |
| CN | 109493814 | A | 3/2019 |
| CN | 109712588 | A | 5/2019 |
| CN | 110785804 | A | 2/2020 |
| EP | 3040968 | A | 7/2016 |
| JP | 2006-166191 | A | 6/2006 |
| JP | 2008-014790 | A | 1/2008 |
| JP | 2011130019 | A * | 6/2011 |
| JP | 2014-215387 | A | 11/2014 |
| JP | 2017-198990 | A | 11/2017 |
| JP | 2018-514801 | | 6/2018 |
| JP | 2018-194719 | A | 12/2018 |
| JP | 2019-020714 | A | 2/2019 |
| KR | 2016-0083590 | A | 7/2016 |
| KR | 2019-0138560 | A | 12/2019 |
| KR | 2020-0015578 | A | 2/2020 |
| WO | WO-2008/004554 | | 1/2008 |
| WO | WO-2019/003026 | | 1/2019 |
| WO | WO-2019/235766 | | 12/2019 |

OTHER PUBLICATIONS

Written Opinion (Application No. PCT/IB2021/050600), dated Apr. 27, 2021.
Taiwanese Office Action (Application No. 113144666) Dated Dec. 20, 2024.

* cited by examiner

FIG. 13A1
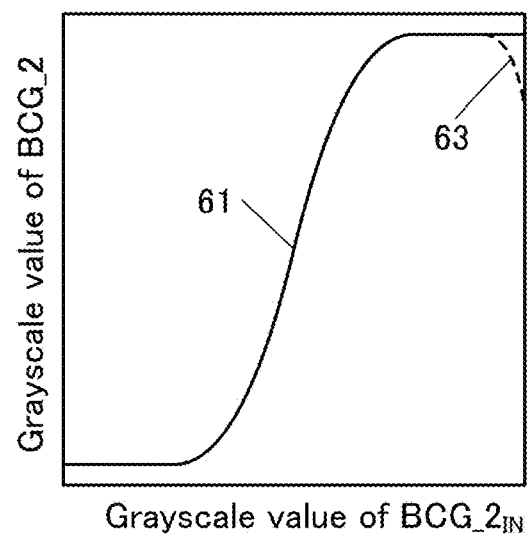
FIG. 13A2
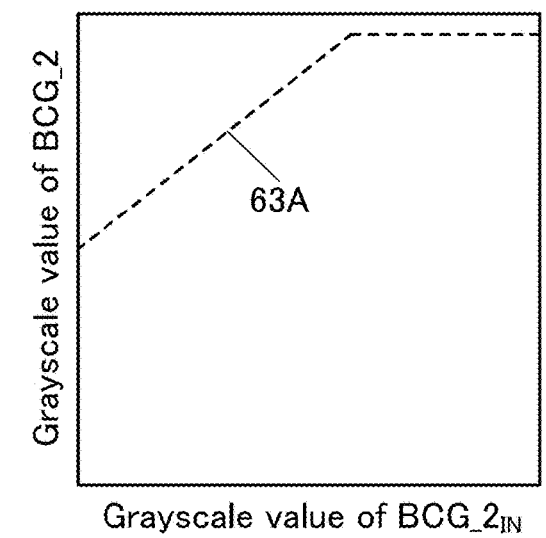
FIG. 13B
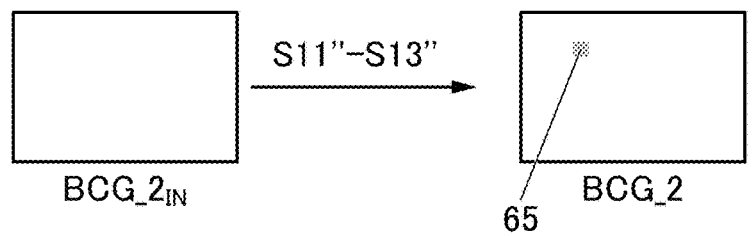

IMAGE SYSTEM DISPLAY BRIGHT SPOT CORRECTION SYSTEM

TECHNICAL FIELD

One embodiment of the present invention relates to an image processing system.

BACKGROUND ART

Display devices such as liquid crystal displays and organic EL displays can be manufactured by application of a resist onto a substrate, light exposure through a mask, and patterning. Here, an increase in size of such display devices involves an increase in size of their substrates; however, in some cases, a mask cannot be increased in size in accordance with the substrate size. As a method for manufacturing display devices in such a case, Patent Document 1 discloses a method in which a substrate plane is divided into a plurality of light exposure regions that fit the size of a mask and light exposure is performed for each light exposure region.

Poor characteristics, deterioration, or the like of a display element, a transistor, or the like included in a pixel of a display device sometimes causes a defective pixel. Such a defective pixel causes a bright spot or a dark spot, for example. Here, a bright spot is more noticeable than a dark spot when an image displayed on a display device is seen, so that such a bright spot exerts a large adverse effect on the visibility. Thus, a display device having many bright spots cannot display high-quality images in some cases. Patent Document 2 discloses a method for darkening a bright spot in a manufacturing process of a display device.

REFERENCE

Patent Documents

[Patent Document 1] Japanese Published Patent Application No. 2017-198990
[Patent Document 2] Japanese Translation of PCT International Application No. 2018-514801

SUMMARY OF THE INVENTION

Problems to be Solved by the Invention

In the case where divided light exposure is performed as described above, deviation of the position of a mask from a light exposure region or the like sometimes makes the amount of light with which the boundary between light exposure regions is exposed different from the amount of light with which another region is exposed. Thus, the characteristics of an element of a pixel provided at the boundary between light exposure regions are sometimes different from the characteristics of an element of a pixel provided in another region. As a result, the luminance of light emitted by a pixel provided at the boundary between light exposure regions is sometimes different from the luminance of light emitted by a pixel provided in another region even when the gradation levels are the same. The difference in luminance is seen as display unevenness in some cases.

In a possible method for making display unevenness less noticeable, image processing is performed on the image data input to a display device. In a possible method, for example, image processing is performed using machine learning. Specifically, in a possible method, a generator generates a machine learning model and image processing based on the machine learning model is performed on the image data input to the display device. In the case where the display device performs image processing using the machine learning model that is generated by the generator, the display device and the generator can be regarded as constituting an image processing system.

Even a pixel not causing a bright spot during manufacture of a display device sometimes causes a bright spot when, for example, electrical characteristics change owing to deterioration of a display element, a transistor, or the like included in the pixel as a result of long-term use of the display device. Such a bright spot is difficult to eliminate in the manufacturing process of the display device.

An object of one embodiment of the present invention is to provide an image processing system that can make less noticeable display unevenness of an image displayed on a display device. An object of one embodiment of the present invention is to provide an image processing system that can make an image displayed on a display device have high quality. An object of one embodiment of the present invention is to provide an image processing system including a large-sized display device. An object of one embodiment of the present invention is to provide an image processing system including a display device capable of displaying a high-resolution image. An object of one embodiment of the present invention is to provide an image processing system that can perform image processing in a short time. An object of one embodiment of the present invention is to provide an image processing system including a highly reliable display device.

An object of one embodiment of the present invention is to provide a novel image processing system, a novel image processing method, a novel generator, a novel method for generating a machine learning model, a novel image processing device, a novel display device, or the like.

Note that the description of these objects does not preclude the existence of other objects. One embodiment of the present invention does not have to achieve all the objects. Other objects will be apparent from and can be derived from the description of the specification, the drawings, the claims, and the like.

Means for Solving the Problems

One embodiment of the present invention relates to an image processing system including a display device, an image capturing device, and a learning device and a method for generating a machine learning model using the image processing system. In the display device, m rows and n columns of pixels (m and n are each an integer of greater than or equal to 2) are arranged in a matrix. The learning device includes a database. The database stores a table generated in accordance with first image data and second image data that is acquired by display of an image corresponding to the first image data on the display device and image capturing of the image by the image capturing device. The first image data has m rows and n columns of first grayscale values, and the second image data has m rows and n columns of second grayscale values. Specifically, the table represents the first grayscale values and the second grayscale values at coordinates corresponding to the coordinates of the first grayscale values.

At the time of generation of the machine learning model, first, the display device displays an image corresponding to first learning image data, and the image capturing device performs image capturing of the image displayed on the display device, so that second learning image data is acquired. Then, the learning device performs image processing on the first learning image data in accordance with the second learning image data, so that third learning image data having m rows and n columns of third grayscale values is generated. Specifically, the learning device performs image processing on the first learning image data such that the first learning image data becomes close to the second learning image data, so that the third learning image data having the m rows and n columns of third grayscale values is generated. For example, the image processing is performed on the first learning image data such that the value obtained by adding up the third grayscale values in the first row and the first column through the m-th row and the n-th column becomes equal to the value obtained by adding up the grayscale values in the first row and the first column through the m-th row and the n-th column of the second learning image data.

Subsequently, the learning device selects the second grayscale values in the first row and the first column through the m-th row and the n-th column in accordance with the third grayscale values in the first row and the first column through the m-th row and the n-th column. For example, the second grayscale value that is a value matching the third grayscale value or the value closest thereto is selected for each of the first row and the first column through the m-th row and the n-th column. Then, fourth learning image data that is image data including the first grayscale values corresponding to the second grayscale values selected is generated. Then, the learning device generates a machine learning model such that image data output when the first learning image data is input matches the fourth learning image data.

The machine learning model generated by the learning device is supplied to the display device. This enables the display device to perform image processing based on the machine learning model on the image data input to the display device. For example, image processing such that display unevenness is reduced can be performed on the image data input to the display device, on the basis of the machine learning model.

One embodiment of the present invention is an image processing system which includes a display device, an image capturing device, and a learning device and in which the display device includes an input portion, a machine learning processing portion, and a display portion in which m rows and n columns of pixels (m and n are each an integer of greater than or equal to 2) are arranged in a matrix; the learning device includes a database, an image processing portion, an image generation portion, and a learning portion; the database stores a table generated in accordance with first image data input to the input portion and second image data acquired by display of an image corresponding to the first image data on the display portion and image capturing by the image capturing device in a manner to include the image displayed on the display portion; the first image data has m rows and n columns of first grayscale values; the second image data has m rows and n columns of second grayscale values; the table represents the first grayscale values and the second grayscale values at coordinates corresponding to coordinates of the first grayscale values; the image processing portion has a function of performing, in accordance with second learning image data, image processing on first learning image data input to the input portion and thereby generating third learning image data; the second learning image data is image data acquired by display of an image corresponding to the first learning image data on the display portion and image capturing by the image capturing device in a manner to include the image displayed on the display portion; the third learning image data has m rows and n columns of third grayscale values; the image generation portion has a function of generating fourth learning image data that is image data including the first grayscale values corresponding to the second grayscale values selected in accordance with the third grayscale values; the learning portion has a function of generating a machine learning model such that image data output when the first learning image data is input matches the fourth learning image data and outputting the machine learning model to the machine learning processing portion; and the machine learning processing portion has a function of performing processing based on the machine learning model on content image data input to the input portion.

In the above embodiment, the first learning image data may have m rows and n columns of fourth grayscale values, the second learning image data may have m rows and n columns of fifth grayscale values, and the image processing portion may have a function of performing the image processing in a manner to make the difference between the sum of the third grayscale values and the sum of the fifth grayscale values smaller than the difference between the sum of the fourth grayscale values and the sum of the fifth grayscale values.

In the above embodiment, the machine learning model may be a neural network model.

Another embodiment of the present invention is a method in which a machine learning model is generated by an image processing system including a display portion where m rows and n columns of pixels (m and n are each an integer of greater than or equal to 2) are arranged in a matrix. In the method, an image corresponding to first image data having m rows and n columns of first grayscale values is displayed on the display portion by emission of light with luminances corresponding to the first grayscale values from the pixels, and image capturing is performed in a manner to include the image corresponding to the first image data and being displayed on the display portion, so that second image data having m rows and n columns of second grayscale values is acquired. A table is generated which represents the first grayscale values and the second grayscale values at the coordinates corresponding to the coordinates of the first grayscale values. An image corresponding to first learning image data is displayed on the display portion, and image capturing is performed in a manner to include the image corresponding to the first learning image data and being displayed on the display portion, so that second learning image data is acquired. Image processing is performed on the first learning image data in accordance with the second learning image data, so that third learning image data having m rows and n columns of third grayscale values is generated. Fourth learning image data that is image data including the first grayscale values corresponding to the second grayscale values selected in accordance with the third grayscale values is generated. A machine learning model such that image data output when the first learning image data is input matches the fourth learning image data is generated.

In the above embodiment, the first learning image data may have m rows and n columns of fourth grayscale values, the second learning image data may have m rows and n columns of fifth grayscale values, and the image processing may be performed in a manner to make the difference between the sum of the third grayscale values and the sum of the fifth grayscale values smaller than the difference between the sum of the fourth grayscale values and the sum of the fifth grayscale values.

In the above embodiment, the machine learning model may be a neural network model.

Another embodiment of the present invention is an image processing system which includes a display device, an image capturing device, and a generator and in which the display device includes an input portion, a bright spot correction portion, and a display portion in which m rows and n columns of pixels (m and n are each an integer of greater than or equal to 2) are arranged in a matrix; the generator includes a database and an image generation portion; the database stores a table generated in accordance with first database image data input to the input portion and second database image data acquired by display of an image corresponding to the first database image data on the display portion and image capturing by the image capturing device in a manner to include the image displayed on the display portion; the first database image data has m rows and n columns of first grayscale values; the second database image data has m rows and n columns of second grayscale values; the table represents the first grayscale values and the second grayscale values at coordinates corresponding to coordinates of the first grayscale values; the image capturing device has a function of performing image capturing of, when the display portion displays an image corresponding to first bright spot correction image data input to the input portion, the image displayed on the display portion and thereby acquiring second bright spot correction image data; the second bright spot correction image data has m rows and n columns of third grayscale values; the image generation portion has a function of generating third bright spot correction image data that is image data including the first grayscale values corresponding to the second grayscale values selected in accordance with the third grayscale values; the bright spot correction portion has a function of detecting, as bright spot coordinates, coordinates of the first grayscale values smaller than or equal to a threshold value among m rows and n columns of the first grayscale values of the third bright spot correction image data; and the bright spot correction portion has a function of reducing, when content image data having m rows and n columns of fourth grayscale values is input to the input portion, the fourth grayscale values at coordinates that are the same as the bright spot coordinates.

Another embodiment of the present invention is an image processing system which includes a display device, an image capturing device, and a generator and in which the display device includes an input portion, a bright spot correction portion, and a display portion in which m rows and n columns of pixels (m and n are each an integer of greater than or equal to 2) are arranged in a matrix; the generator includes a database and an image generation portion; the database stores a table generated in accordance with first database image data input to the input portion and second database image data acquired by display of an image corresponding to the first database image data on the display portion and image capturing by the image capturing device in a manner to include the image displayed on the display portion; the first database image data has m rows and n columns of first grayscale values; the second database image data has m rows and n columns of second grayscale values; the table represents the first grayscale values and the second grayscale values at coordinates corresponding to coordinates of the first grayscale values; the image capturing device has a function of performing image capturing of, when the display portion displays an image corresponding to first bright spot correction image data input to the input portion, the image displayed on the display portion and thereby acquiring second bright spot correction image data; the second bright spot correction image data has m rows and n columns of third grayscale values; the image generation portion has a function of generating third bright spot correction image data that is image data including the first grayscale values corresponding to the second grayscale values selected in accordance with the third grayscale values; the bright spot correction portion has a function of detecting, as first bright spot coordinates, coordinates of the first grayscale values smaller than or equal to a first threshold value among m rows and n columns of the first grayscale values of the third bright spot correction image data; the bright spot correction portion has a function of detecting, as second bright spot coordinates, coordinates of the third grayscale values larger than or equal to a second threshold value among the m rows and n columns of third grayscale values of the second bright spot correction image data; and the bright spot correction portion has a function of reducing, when content image data having m rows and n columns of fourth grayscale values is input to the input portion, the fourth grayscale values at coordinates that are the same as the first or second bright spot coordinates.

Another embodiment of the present invention is an image processing system which includes a display device, an image capturing device, and a generator and in which the display device includes an input portion, a bright spot correction portion, and a display portion in which m rows and n columns of pixels (m and n are each an integer of greater than or equal to 2) are arranged in a matrix; the generator includes a database and an image generation portion; the database stores a table generated in accordance with first database image data input to the input portion and second database image data acquired by display of an image corresponding to the first database image data on the display portion and image capturing by the image capturing device in a manner to include the image displayed on the display portion; the first database image data has m rows and n columns of first grayscale values; the second database image data has m rows and n columns of second grayscale values; the table represents the first grayscale values and the second grayscale values at coordinates corresponding to coordinates of the first grayscale values; the image capturing device has a function of performing image capturing of, when the display portion displays an image corresponding to first bright spot correction image data input to the input portion, the image displayed on the display portion and thereby acquiring second bright spot correction image data; the second bright spot correction image data has m rows and n columns of third grayscale values; the image generation portion has a function of generating third bright spot correction image data that is image data including the first grayscale values corresponding to the second grayscale values selected in accordance with the third grayscale values; the bright spot correction portion has a function of detecting, as first bright spot coordinates, coordinates of the first grayscale values smaller than or equal to a first threshold value and larger than or equal to a second threshold value among m rows and n columns of the first grayscale values of the third bright spot correction image data and detecting, as second bright spot coordinates, coordinates of the first grayscale values smaller than the second threshold value among the m rows and n columns of first grayscale values of the third bright spot correction image data; the bright spot correction portion has a function of detecting, as third bright spot coordinates, coordinates of the third grayscale values larger than or equal to a third threshold value among the m rows and n columns of third grayscale values of the second bright spot correction image data; the bright spot correction portion has a function of reducing, when content image data having m rows and n columns of fourth grayscale values is input to the input portion, the fourth grayscale values at coordinates that are the same as both the first bright spot coordinates and the third bright spot coordinates and has a function of reducing the fourth grayscale values at coordinates that are the same as the second bright spot coordinates.

In the above embodiment, the display device may include a machine learning processing portion; the generator may include an image processing portion and a learning portion; the image processing portion may have a function of performing, in accordance with second learning image data, image processing on first learning image data input to the input portion and thereby generating third learning image data; the second learning image data may be image data acquired by display of an image corresponding to the first learning image data on the display portion and image capturing by the image capturing device in a manner to include the image displayed on the display portion; the third learning image data may have m rows and n columns of fifth grayscale values; the image generation portion may have a function of generating fourth learning image data that is image data including the first grayscale values corresponding to the second grayscale values selected in accordance with the fifth grayscale values; the learning portion may have a function of generating a machine learning model such that image data output when the first learning image data is input matches the fourth learning image data and outputting the machine learning model to the machine learning processing portion; and the machine learning processing portion may have a function of performing processing based on the machine learning model on content image data input to the input portion.

In the above embodiment, the first learning image data may have m rows and n columns of sixth grayscale values, the second learning image data may have m rows and n columns of seventh grayscale values, and the image processing portion may have a function of performing the image processing in a manner to make the difference between the sum of the fifth grayscale values and the sum of the seventh grayscale values smaller than the difference between the sum of the sixth grayscale values and the sum of the seventh grayscale values.

In the above embodiment, the machine learning model may be a neural network model.

Effect of the Invention

According to one embodiment of the present invention, an image processing system that can make less noticeable display unevenness of an image displayed on a display device can be provided. According to one embodiment of the present invention, an image processing system that can make an image displayed on a display device have high quality can be provided. According to one embodiment of the present invention, an image processing system including a large-sized display device can be provided. According to one embodiment of the present invention, an image processing system including a display device capable of displaying a high-resolution image can be provided. According to one embodiment of the present invention, an image processing system that can perform image processing in a short time can be provided. According to one embodiment of the present invention, an image processing system including a highly reliable display device can be provided.

According to one embodiment of the present invention, a novel image processing system, a novel image processing method, a novel generator, a novel method for generating a machine learning model, a novel image processing device, a novel display device, or the like can be provided.

Note that the effects of embodiments of the present invention are not limited to the effects listed above. The effects listed above do not preclude the existence of other effects. Note that the other effects are effects that are not described in this section and will be described below. The effects that are not described in this section can be derived from the descriptions of the specification, the drawings, and the like and can be appropriately extracted from these descriptions by those skilled in the art. Note that one embodiment of the present invention has at least one of the effects listed above and/or the other effects. Accordingly, depending on the case, one embodiment of the present invention does not have the effects listed above in some cases.

BRIEF DESCRIPTION OF THE DRAWINGS

FIG. 2B1 and FIG. 2B2 are circuit diagrams showing structure examples of a pixel.

FIG. 13A1 and FIG. 13A2 are graphs showing an example of an image processing method. FIG. 13B is a schematic view showing an example of an image processing method.

MODE FOR CARRYING OUT THE INVENTION

Figure 1:
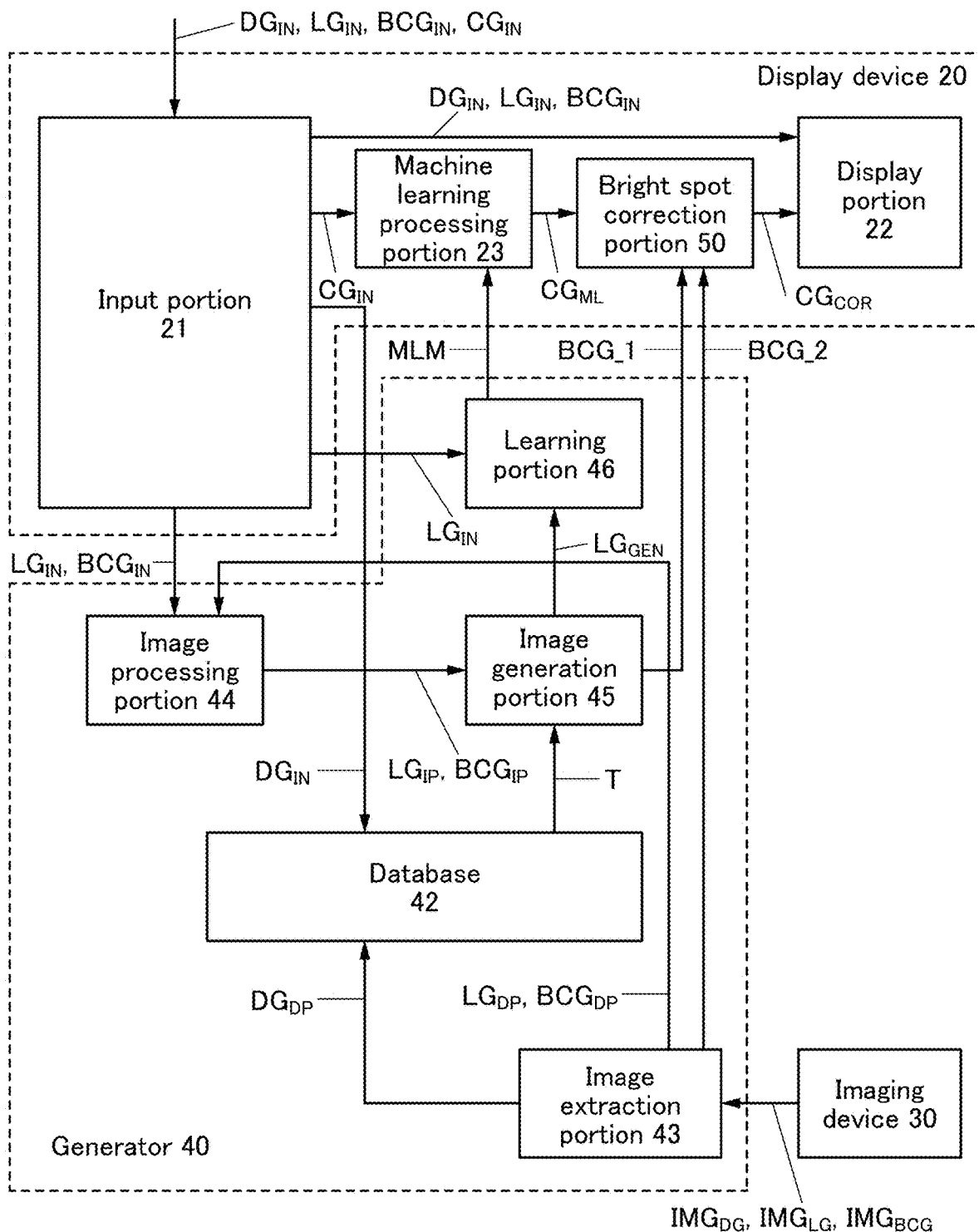
FIG. 1 is a block diagram showing a structure example of an image processing system.

An embodiment is described in detail with reference to drawings. Note that the present invention is not limited to the following description, and it will be readily understood by those skilled in the art that modes and details of the present invention can be modified in various ways without departing from the spirit and scope of the present invention. Therefore, the present invention should not be interpreted as being limited to the description of the embodiment below.

Note that in structures of the present invention described below, the same reference numerals are used in common for the same portions or portions having similar functions in different drawings, and a repeated description thereof is omitted. Furthermore, the same hatch pattern is used for the portions having similar functions, and the portions are not especially denoted by reference numerals in some cases.

The position, size, range, or the like of each component shown in drawings does not represent the actual position, size, range, or the like in some cases for easy understanding. Therefore, the disclosed invention is not necessarily limited to the position, size, range, or the like disclosed in drawings.

Ordinal numbers such as "first", "second", and "third" used in this specification are used in order to avoid confusion among components and do not limit the components numerically.

Embodiment

In this embodiment, an image processing system and the like of embodiments of the present invention will be described with reference to drawings.

<Image Processing System>

FIG. 1 is a block diagram showing a structure example of an image processing system 10. The image processing system 10 includes a display device 20, an image capturing device 30, and a generator 40. Here, the generator 40 is preferably provided in a device having a high arithmetic capacity such as a server.

The display device 20 includes an input portion 21, a display portion 22, a machine learning processing portion 23, and a bright spot correction portion 50. The generator 40 includes a database 42, an image extraction portion 43, an image processing portion 44, an image generation portion 45, and a learning portion 46.

Figure 2A:
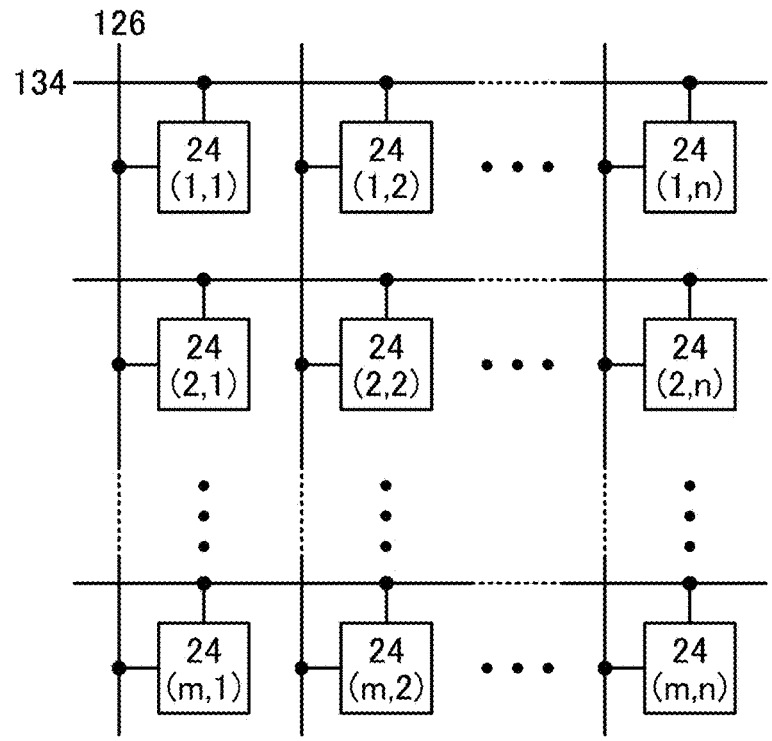
FIG. 2A is a block diagram showing a structure example of a display portion.

FIG. 2A is a block diagram showing a structure example of the display portion 22. In the display portion 22, m rows and n columns of pixels 24 (m and n are each an integer of greater than or equal to 2) are arranged in a matrix as shown in FIG. 2A. The pixels 24 in the same row are electrically connected to one another through a single wiring 134, and the pixels 24 in the same column are electrically connected to one another through a single wiring 126. The pixel 24 includes a display element, and an image can be displayed on the display portion 22 with the use of the display element.

In this specification and the like, the m rows and n columns of pixels 24 are distinguished from one another by being referred to as a pixel 24(1,1) to a pixel 24(m,n). The same description applies to other components in some cases. In addition, (1,1) to (m,n) are sometimes referred to as coordinates, for example.

In this specification and the like, a display element can be rephrased as a display device. A light-emitting element can be rephrased as a light-emitting device, and a liquid crystal element can be rephrased as a liquid crystal device. Also for other elements, "element" can be rephrased as "device" in some cases.

In FIG. 1, exchange of data between the components of the image processing system 10 is shown by arrows. Note that the data exchange shown in FIG. 1 is an example, and data or the like can be sometimes exchanged between components that are not connected by an arrow, for example. Furthermore, data is not exchanged between components that are connected by an arrow in some cases.

Image data is input to the input portion 21. The image data input to the input portion 21 can be output to the display portion 22, the machine learning processing portion 23, the database 42, the image processing portion 44, or the learning portion 46.

Examples of the image data input to the input portion 21 include database image data $DG_{IN}$, learning image data $LG_{IN}$, bright spot correction image data $BCG_{IN}$, and content image data $CG_{IN}$. The database image data $DG_{IN}$ can be supplied from the input portion 21 to the display portion 22 and the database 42. The learning image data $LG_{IN}$ can be supplied from the input portion 21 to the display portion 22 and the image processing portion 44. The bright spot correction image data $BCG_{IN}$ can be supplied from the input portion 21 to the display portion 22 and the image processing portion 44. The content image data $CG_{IN}$ can be supplied from the input portion 21 to the machine learning processing portion 23.

The display portion 22 has a function of displaying an image corresponding to image data. Here, the image data can be a set of grayscale values. For example, the image data supplied to the display portion 22 can be configured to have m rows and n columns of grayscale values. In this case, the pixels 24 emit light having luminances corresponding to the grayscale values, so that an image can be displayed on the display portion 22. Here, the grayscale value can be a digital value. In the case where the grayscale value is an 8-bit digital value, for example, the grayscale value can be an integer of 0 to 255.

The machine learning processing portion 23 has a function of performing image processing on the image data on the basis of a machine learning model generated by the generator 40. Specifically, the machine learning processing portion 23 has a function of performing image processing on the content image data $CG_{IN}$ input from the input portion 21, on the basis of a machine learning model MLM generated by the learning portion 46. The image data that has been subjected to the image processing by the machine learning processing portion 23 is supplied as content image data $CG_{ML}$ to the bright spot correction portion 50.

As the machine learning model MLM, for example, a multilayer perceptron, a neural network model, or the like can be employed. It is particularly preferable to employ a neural network model to perform efficient image processing and to display a high-quality image on the display portion 22. Here, a generation model such as an autoencoder, U-net, or pix2pix can be used as the neural network model, for example. Note that any of other machine learning models can be used as the machine learning model MLM as long as Bayes estimation can be performed. It is preferable that the machine learning model MLM can perform learning and inference with an input value and an output value dealt with independently.

The bright spot correction portion 50 has a function of correcting the content image data $CG_{ML}$. Specifically, the bright spot correction portion 50 has a function of correcting the grayscale value of the content image data $CG_{ML}$. Although the details will be described later, the bright spot correction portion 50 has a function of correcting the grayscale value of the content image data $CG_{ML}$ in accordance with bright spot correction image data BCG_1 generated by the image generation portion 45 or bright spot correction image data BCG_2 generated by the image extraction portion 43. The image data after the correction is supplied as content image data $CG_{COR}$ to the display portion 22.

In this specification and the like, the bright spot correction image data BCG_1, the bright spot correction image data BCG_2, and the like are sometimes collectively referred to as bright spot correction image data BCG. Specifically, "bright spot correction image data BCG" refers to one of the bright spot correction image data BCG_1 and the bright spot correction image data BCG_2, for example. The same description applies to other data and the like in some cases.

Here, the bright spot correction portion 50 has a function of correcting the content image data $CG_{ML}$ in a manner to make a bright spot in the display portion 22 less noticeable. The bright spot correction portion 50 has a function of correcting the content image data $CG_{ML}$ in a manner to darken a bright spot, for example. Thus, providing the display device 20 with the bright spot correction portion 50 can enhance the quality of images to be displayed on the display portion 22.

In this specification and the like, "darken" and "be changed into a dark spot" mean reducing the luminance of the light emitted from the pixel 24 that causes a bright spot. Accordingly, the luminance of the light emitted from the pixel 24 darkened is not necessarily 0.

Note the display device 20 does not necessarily include the bright spot correction portion 50. In this case, the bright spot correction image data $BCG_{IN}$ is not input to the input portion 21. The content image data $CG_{ML}$ output by the machine learning processing portion 23 can be supplied to the display portion 22.

The image capturing device 30 has a function of performing image capturing to acquire image capturing data. Specifically, the image capturing device 30 can perform image capturing in a manner to include the image displayed on the display portion 22. The image capturing data acquired is supplied to the image extraction portion 43. Here, the image capturing data acquired through display of an image corresponding to the database image data $DG_{IN}$ on the display portion 22 and image capturing by the image capturing device 30 in a manner to include the image is referred to as image capturing data $IMG_{DG}$. The image capturing data acquired through display of an image corresponding to the learning image data $LG_{IN}$ on the display portion 22 and image capturing by the image capturing device 30 in a manner to include the image is referred to as image capturing data $IMG_{LG}$. The image capturing data acquired through display of an image corresponding to the bright spot correction image data $BCG_{IN}$ on the display portion 22 and image capturing by the image capturing device 30 in a manner to include the image is referred to as image capturing data $IMG_{BCG}$. The image capturing data can be a set of grayscale values.

The image extraction portion 43 has a function of extracting, from the image capturing data $IMG_{DG}$, the image capturing data $IMG_{LG}$, the image capturing data $IMG_{BCG}$, and the like, data on a portion representing the image displayed on the display portion 22. In the case where the image capturing device 30 performs image capturing in a manner to include the image displayed on the display portion 22, image capturing of a region other than the display portion 22 is also performed in some cases. For example, image capturing of a housing of the display device 20 as well as the display portion 22 is performed in some cases. The image extraction portion 43 has a function of extracting the data on the portion representing the image displayed on the display portion 22 when the image capturing data includes a portion other than the image displayed on the display portion 22 as described above. The data extraction can be performed by pattern matching, template matching, or the like. For example, in the case of extracting the data on the portion representing the image displayed on the display portion 22 from image capturing data that includes the image displayed on the display portion 22 and the housing of the display device 20, a pattern representing the housing of the display device 20 can be specified, and a portion not including the pattern can be the data on the portion representing the image displayed on the display portion 22. Furthermore, edge detection can be performed on the image capturing data $IMG_{DG}$, the image capturing data $IMG_{LG}$, the image capturing data $IMG_{BCG}$, and the like, and the data on the portion representing the image displayed on the display portion 22 can be extracted.

The data extracted by the image extraction portion 43 from the image capturing data $IMG_{DG}$ is database image data $DG_{DP}$. The data extracted by the image extraction portion 43 from the image capturing data $IMG_{LG}$ is learning image data $LG_{DP}$. Furthermore, the data extracted by the image extraction portion 43 from the image capturing data $IMG_{BCG}$ is bright spot correction image data $BCG_{DP}$. The database image data $DG_{DP}$ is supplied to the database 42, and the learning image data $LG_{DP}$ and the bright spot correction image data $BCG_{DP}$ are supplied to the image processing portion 44. Note that the bright spot correction image data $BCG_{DP}$ may be supplied to the image generation portion 45, not to the image processing portion 44.

The image extraction portion 43 can supply the bright spot correction image data $BCG_{DP}$ to the bright spot correction portion 50. The bright spot correction image data $BCG_{DP}$ supplied to the bright spot correction portion 50 is the bright spot correction image data BCG_2.

Here, although the details will be described later, the image processing system 10 has a function of acquiring a table representing information on correspondence between the database image data $DG_{IN}$ and the database image data $DG_{DP}$. The image processing system 10 also has a function of comparing the learning image data $LG_{IN}$ with the learning image data $LG_{DP}$. The image processing system 10 also has a function of comparing the bright spot correction image data $BCG_{IN}$ with the bright spot correction image data $BCG_{DP}$.

It is thus preferable that the resolution of an image represented by the database image data $DG_{IN}$ be equal to the resolution of an image represented by the database image data $DG_{DP}$. Specifically, the number of rows and the number of columns of the grayscale values included in the database image data $DG_{IN}$ are preferably equal to the number of rows and the number of columns of the grayscale values included in the database image data $DG_{DP}$. For example, in the case where the database image data $DG_{IN}$ includes m rows and n columns of grayscale values, it is preferable that the database image data $DG_{DP}$ also include m rows and n columns of grayscale values. It is also preferable that the resolution of an image represented by the learning image data $LG_{IN}$ be equal to the resolution of an image represented by the learning image data $LG_{DP}$. Specifically, the number of rows and the number of columns of the grayscale values included in the learning image data $LG_{IN}$ are preferably equal to the number of rows and the number of columns of the grayscale values included in the learning image data $LG_{DP}$. For example, in the case where the learning image data $LG_{IN}$ includes m rows and n columns of grayscale values, it is preferable that the learning image data $LG_{DP}$ also include m rows and n columns of grayscale values. It is also preferable that the resolution of an image represented by the bright spot correction image data $BCG_{IN}$ be equal to the resolution of an image represented by the bright spot correction image data $BCG_{DP}$. Specifically, the number of rows and the number of columns of the grayscale values included in the bright spot correction image data $BCG_{IN}$ are preferably equal to the number of rows and the number of columns of the grayscale values included in the bright spot correction image data $BCG_{DP}$. For example, in the case where the bright spot correction image data $BCG_{IN}$ includes m rows and n columns of grayscale values, it is preferable that the bright spot correction image data $BCG_{DP}$ also include m rows and n columns of grayscale values.

In this specification and the like, the grayscale values of the database image data $DG_{IN}$ are sometimes referred to as first grayscale values. The grayscale values of the database image data $DG_{DP}$ are sometimes referred to as second grayscale values.

The image extraction portion 43 can perform upconversion or downconversion on the data extracted from the image capturing data. For example, in the case where the number of rows or the number of columns of the grayscale values of the data extracted by the image extraction portion 43 from the image capturing data $IMG_{DG}$ is smaller than the number of rows or the number of columns of the database image data $DG_{IN}$, the image extraction portion 43 can perform upconversion on the data extracted from the image capturing data $IMG_{DG}$. In the case where the number of rows or the number of columns of the grayscale values of the data extracted by the image extraction portion 43 from the image capturing data $IMG_{DG}$ is larger than the number of rows or the number of columns of the database image data $DG_{IN}$, the image extraction portion 43 can perform downconversion on the data extracted from the image capturing data $IMG_{DG}$. This can make the number of rows and the number of columns of the grayscale values included in the database image data $DG_{DP}$ equal to the number of rows and the number of columns of the grayscale values included in the database image data $DG_{IN}$. The same applies to the image capturing data $IMG_{LG}$ and the image capturing data $IMG_{BCG}$. Note that upconversion and downconversion can be performed by a nearest-neighbor method, a bilinear method, a bicubic method, or the like.

The database 42 can store a table T representing information on correspondence between the database image data $DG_{IN}$ and the database image data $DG_{DP}$. Specifically, the table T represents information on correspondence between the first grayscale values of the database image data $DG_{IN}$ and the second grayscale values of the database image data $DG_{DP}$. The table T represents, for example, the first grayscale values and the second grayscale values at the coordinates corresponding to the coordinates of the first grayscale values. For example, the table T represents the first grayscale values and the second grayscale values at the same coordinates as the first grayscale values.

The image processing portion 44 has a function of performing image processing on the learning image data $LG_{IN}$ in accordance with the learning image data $LG_{DP}$ to generate learning image data $LG_{IP}$. That is, the image processing portion 44 has a function of comparing the learning image data $LG_{IN}$ with the learning image data $LG_{DP}$, performing image processing on the learning image data $LG_{IN}$ in accordance with a result of the comparison, and thereby generating the learning image data $LG_{IP}$. For example, the image processing portion 44 has a function of performing image processing on the learning image data $LG_{IN}$ such that the learning image data $LG_{IN}$ becomes close to the learning image data $LG_{DP}$ and thereby generating the learning image data $LG_{IP}$. The image processing portion 44 has a function of similarly performing image processing on the bright spot correction image data $BCG_{IN}$ to generate bright spot correction image data $BCG_{IP}$.

For example, the image processing portion 44 has a function of converting the grayscale values of the learning image data $LG_{IN}$ by image processing in a manner to make the difference between the sum of the grayscale values of the learning image data $LG_{IP}$ and the sum of the grayscale values of the learning image data $LG_{DP}$ smaller than the difference between the sum of the grayscale values of the learning image data $LG_{IP}$ and the sum of the grayscale values of the learning image data $LG_{IN}$. For example, the image processing portion 44 has a function of converting the grayscale values of the learning image data $LG_{IN}$ by image processing in a manner to make the sum of the grayscale values of the learning image data $LG_{IP}$ equal to the sum of the grayscale values of the learning image data $LG_{DP}$. Note that "the sum of the grayscale values of the learning image data $LG_{IP}$" may be the sum of all the grayscale values of the learning image data $LG_{IP}$ or the sum of some of the grayscale values. "The sum of the grayscale values of the learning image data $LG_{IN}$" may be the sum of all the grayscale values of the learning image data $LG_{IN}$ or the sum of some of the grayscale values. "The sum of the grayscale values of the learning image data $LG_{DP}$" may be the sum of all the grayscale values of the learning image data $LG_{DP}$ or the sum of some of the grayscale values.

The image processing portion 44 has a function of converting the grayscale values of the learning image data $LG_{IN}$ by image processing in a manner to make the peak signal-to-noise ratio (PSNR: Peak Signal-to-Noise Ratio) or structural similarity (SSIM: Structural SIMilarity) of the learning image data $LG_{IP}$ with respect to the learning image data $LG_{DP}$ larger than the PSNR or SSIM with respect to the learning image data $LG_{IN}$, for example. The image processing portion 44 has a function of converting the grayscale values of the learning image data $LG_{IN}$ by image processing in a manner to maximize the PSNR or SSIM with respect to the learning image data $LG_{DP}$ and thereby generating the learning image data $LG_{IP}$, for example.

The image processing performed by the image processing portion 44 can be gamma correction, for example. In this case, the above image processing can be performed by setting a gamma value to an appropriate value.

For example, the image processing portion 44 has a function of converting the grayscale values of the bright spot correction image data $BCG_{IN}$ by image processing in a manner to make the difference between the sum of the grayscale values of the bright spot correction image data $BCG_{IP}$ and the sum of the grayscale values of the bright spot correction image data $BCG_{DP}$ smaller than the difference between the sum of the grayscale values of the bright spot correction image data $BCG_{IP}$ and the sum of the grayscale values of the bright spot correction image data $BCG_{IN}$. For the image processing and the like, the above description can be referred to when the learning image data $LG_{IP}$ is replaced with the bright spot correction image data $BCG_{IP}$, the learning image data $LG_{DP}$ is replaced with the bright spot correction image data $BCG_{DP}$, and the learning image data $LG_{IN}$ is replaced with the bright spot correction image data $BCG_{IN}$.

The image generation portion 45 has a function of selecting the second grayscale values included in the table T in accordance with the grayscale values of the learning image data $LG_{IP}$. For example, it is assumed that the database image data $DG_{IN}$ has m rows and n columns of the first grayscale values, the database image data $DG_{DP}$ has m rows and n columns of the second grayscale values, and the learning image data $LG_{IP}$ has m rows and n columns of grayscale values. In this case, the image generation portion 45 can select the second grayscale values in the first row and the first column through the m-th row and the n-th column in accordance with the grayscale values in the first row and the first column through the m-th row and the n-th column, respectively, of the learning image data $LG_{IP}$. Specifically, the second grayscale value that is the value matching a grayscale value of the learning image data $LG_{IP}$ or the value closest thereto can be selected for each of the first row and the first column through the m-th row and the n-th column. For example, it is assumed that the table T represents information on correspondence between k pieces of the database image data $DG_{IN}$ (k is an integer of greater than or equal to 2) and k pieces of the database image data $DG_{DP}$. In this case, for example, the second grayscale value that is the value matching the grayscale value in the i-th row and the j-th column (i is an integer of greater than or equal to 1 and less than or equal to m, and j is an integer of greater than or equal to 1 and less than or equal to n) of the learning image data $LG_{IP}$ or the value closest to thereto can be selected from k pieces of the second grayscale values in the i-th row and the j-th column. Furthermore, the image generation portion 45 has a function of selecting the second grayscale values included in the table T in accordance with the grayscale values of the bright spot correction image data $BCG_{IP}$ by a method similar to the above method. In the case where the bright spot correction image data $BCG_{DP}$ generated by the image extraction portion 43 is supplied to the image generation portion 45, the second grayscale values included in the table T can be selected in accordance with the grayscale values of the bright spot correction image data $BCG_{DP}$ by a method similar to the above method.

In this specification and the like, for example, the grayscale value in the i-th row and the j-th column is sometimes referred to as a "grayscale value at coordinates (i,j)".

The image generation portion 45 has a function of generating learning image data $LG_{GEN}$ that is image data including the first grayscale values corresponding to the second grayscale values selected in accordance with the learning image data $LG_{IP}$. In a similar manner, the image generation portion 45 has a function of generating the bright spot correction image data BCG_1 that is image data including the first grayscale values corresponding to the second grayscale values selected in accordance with the bright spot correction image data $BCG_{IP}$. Note that in the case where the table T includes a plurality of second grayscale values in the i-th row and the j-th column that are each the value matching the grayscale value in the i-th row and the j-th column of the learning image data $LG_{IP}$, for example, one second grayscale value can be selected from the plurality of second grayscale values. Then, the first grayscale value corresponding to the second grayscale value selected can be included in the learning image data $LG_{GEN}$. The same applies to the bright spot correction image data $BCG_{IP}$ and the like.

In the case where the table T does not include the second grayscale value in the i-th row and the j-th column matching the grayscale value in the i-th row and the j-th column of the learning image data $LG_{IP}$, for example, the second grayscale value in the i-th row and the j-th column is not necessarily selected. In this case, the grayscale value in the i-th row and the j-th column of the learning image data $LG_{GEN}$ can be the same as the grayscale value in the i-th row and the j-th column of the learning image data $LG_{IP}$. The same applies to the bright spot correction image data $BCG_{IP}$ and the like.

The learning portion 46 has a function of generating the machine learning model MLM with the use of the learning image data $LG_{IN}$ and the learning image data $LG_{GEN}$. For example, the learning portion 46 has a function of generating the machine learning model MLM such that image data output when the learning image data $LG_{IN}$ is input matches the learning image data $LG_{GEN}$. The learning portion 46 has a function of generating such a machine learning model MLM by supervised learning using the learning image data $LG_{IN}$ and the learning image data $LG_{GEN}$, for example. In this manner, the machine learning model MLM can be generated by learning. The machine learning model MLM generated by the learning portion 46 can be thus regarded as a learned machine learning model.

The machine learning model MLM generated by the learning portion 46 is supplied to the machine learning processing portion 23. The machine learning processing portion 23 can perform inference on the basis of the machine learning model MLM to perform image processing on image data.

Figure 2A:
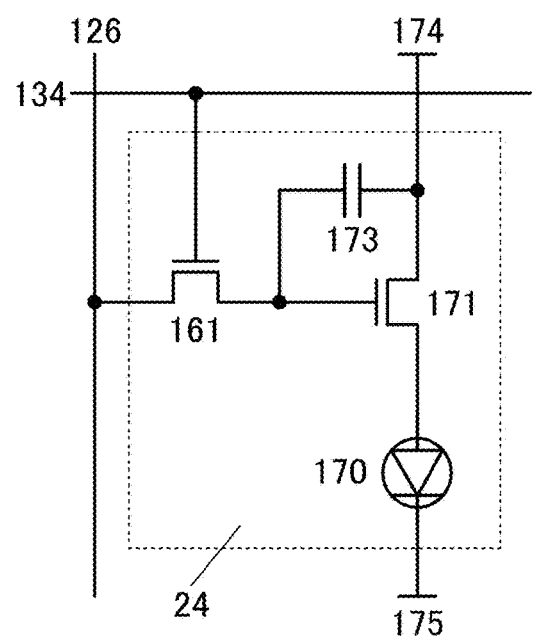
Figure 2A:
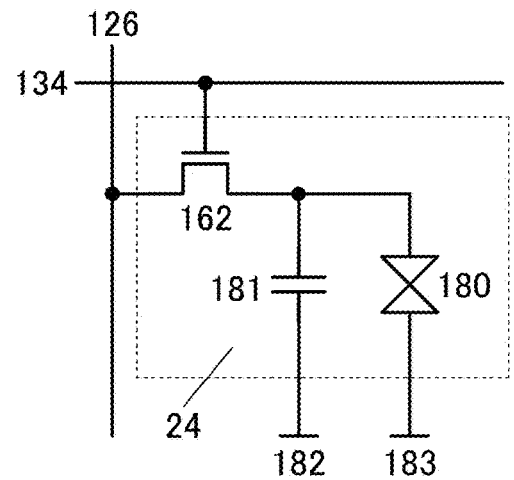

FIG. 2B1 and FIG. 2B2 are circuit diagrams showing structure examples of the pixel 24 shown in FIG. 2A. Specifically, FIG. 2B1 and FIG. 2B2 are circuit diagrams showing structure examples of a subpixel of the pixel 24. The pixel 24 shown in FIG. 2B1 includes a transistor 161, a transistor 171, a capacitor 173, and a light-emitting element 170. In the pixel 24 shown in FIG. 2B1, the light-emitting element 170 can be a display element.

One of a source and a drain of the transistor 161 is electrically connected to a gate of the transistor 171. The gate of the transistor 171 is electrically connected to one electrode of the capacitor 173. One of a source and a drain of the transistor 171 is electrically connected to one electrode of the light-emitting element 170.

The other of the source and the drain of the transistor 161 is electrically connected to the wiring 126. A gate of the transistor 161 is electrically connected to the wiring 134. The other of the source and the drain of the transistor 171 and the other electrode of the capacitor 173 are electrically connected to a wiring 174. The other electrode of the light-emitting element 170 is electrically connected to a wiring 175.

The wiring 174 and the wiring 175 can be supplied with a constant potential. For example, the wiring 174 can be supplied with a high potential and the wiring 175 can be supplied with a low potential in the case where an anode of the light-emitting element 170 is electrically connected to the one of the source and the drain of the transistor 171 and a cathode of the light-emitting element 170 is electrically connected to the wiring 175 as shown in FIG. 2B1.

The light-emitting element 170 can be an organic EL element or an inorganic EL element, for example.

In the case where the pixel 24 provided in the display portion 22 has the structure shown in FIG. 2B1, the display portion 22 can display an image by control of the amount of the current flowing in the light-emitting element 170 and resultant control of the emission luminance of the light-emitting element 170. When a larger amount of current flows in the light-emitting element 170, the light-emitting element can have a higher emission luminance.

The pixel 24 shown in FIG. 2B2 includes a transistor 162, a capacitor 181, and a liquid crystal element 180. In the pixel 24 shown in FIG. 2B2, the liquid crystal element 180 can be a display element.

One of a source and a drain of the transistor 162 is electrically connected to one electrode of the liquid crystal element 180. The one electrode of the liquid crystal element 180 is electrically connected to one electrode of the capacitor 181.

The other of the source and the drain of the transistor 162 is electrically connected to the wiring 126. A gate of the transistor 162 is electrically connected to the wiring 134. The other electrode of the capacitor 181 is electrically connected to a wiring 182. The other electrode of the liquid crystal element 180 is electrically connected to a wiring 183.

The wiring 182 and the wiring 183 can be supplied with a constant potential. For example, the wiring 182 and the wiring 183 can be supplied with a low potential.

In the case where the pixel 24 provided in the display portion 22 has the structure shown in FIG. 2B2, liquid crystal molecules included in the liquid crystal element 180 are oriented in accordance with the voltage applied between the two electrodes of the liquid crystal element 180. In accordance with the degree of orientation, the liquid crystal molecules can transmit, for example, the light from a backlight unit that can be included in the display device 20. As described above, the other electrode of the liquid crystal element 180 is electrically connected to the wiring 183 and is supplied with a constant potential. Accordingly, controlling the potential of the one electrode of the liquid crystal element 180 enables the pixel 24 to emit light having the luminance based on the potential, so that the display portion 22 can display an image.

Figure 3A:
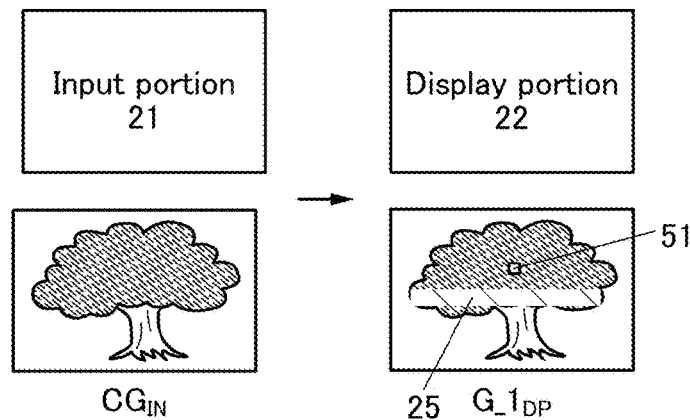
FIG. 3A and FIG. 3B are schematic views showing examples of an image processing method.
Figure 3B:
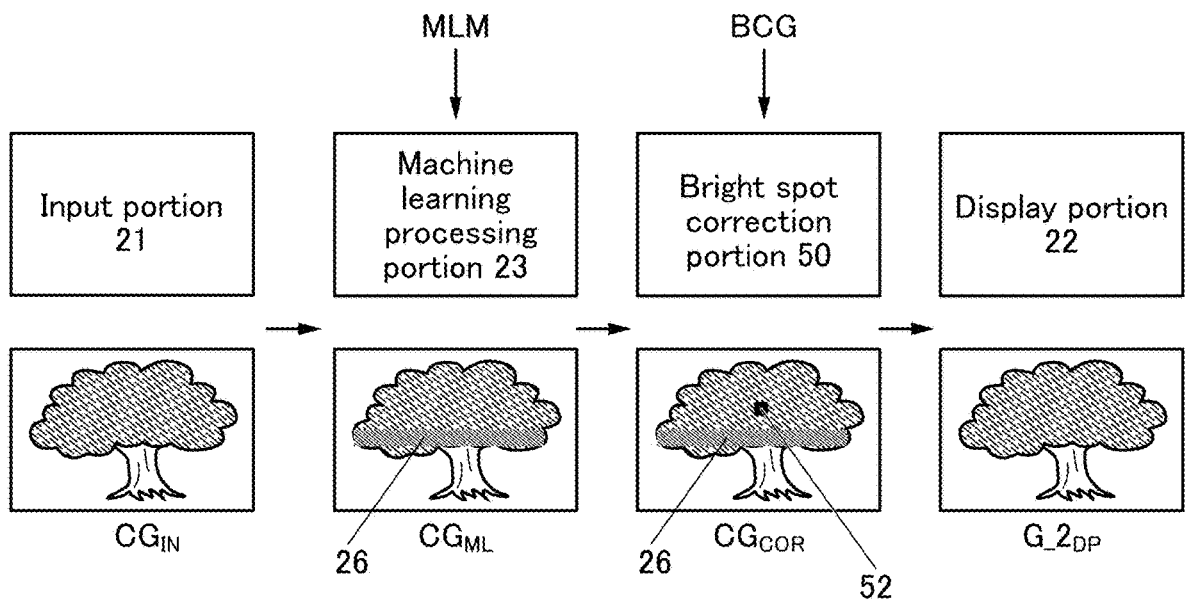

FIG. 3A is a schematic view showing an example of a content image $G\_1_{DP}$ that is displayed on the display portion 22 when the content image data $CG_{IN}$ input to the input portion 21 is directly input to the display portion 22. FIG. 3B is a schematic view showing an example of a content image $G\_2_{DP}$ that is displayed on the display portion 22 when the content image data $CG_{IN}$ is input to the display portion 22 through the machine learning processing portion 23 and the bright spot correction portion 50.

As described above, display unevenness, a bright spot, and the like sometimes occur in the case where the content image data $CG_{IN}$ is input to the display portion 22 without being subjected to image processing or the like. FIG. 3A shows a state where display unevenness 25 and a bright spot 51 occur in the image displayed on the display portion 22.

By performing image processing on the content image data $CG_{IN}$ with the use of the machine learning model MLM, the machine learning processing portion 23 can generate the content image data $CG_{ML}$ such that the display unevenness is canceled. FIG. 3B shows a state where the machine learning processing portion 23 generates the content image data $CG_{ML}$ by adding data such that the display unevenness 25 is canceled to data corresponding to a region 26 in the content image data $CG_{IN}$. For example, in the case where the luminance of a portion in which the display unevenness 25 occurs is higher than that of a peripheral portion of the portion, the luminance of the region 26 can be made lower than that of the peripheral portion of the region 26.

By image processing performed on content image data in accordance with the bright spot correction image data BCG (e.g., one of the bright spot correction image data BCG_1 and the bright spot correction image data BCG_2), the bright spot correction portion 50 can generate the content image data $CG_{COR}$ such that a bright spot is corrected to be less noticeable. For example, the bright spot correction portion 50 can generate the content image data $CG_{COR}$ such that a bright spot is darkened. FIG. 3B shows a state where the bright spot correction portion 50 generates the content image data $CG_{COR}$ by adding data such that the bright spot 51 is made less noticeable to data corresponding to a region 52 in which the bright spot 51 occurs in the content image data $CG_{ML}$.

As shown in FIG. 3B, the machine learning processing portion 23 and the bright spot correction portion 50 perform image processing on the content image data $CG_{IN}$ input to the input portion 21 in the above manner, so that the display portion 22 can display an image in which display unevenness and a bright spot are less noticeable.

As described above, display unevenness is more likely to occur when the area of the display portion 22 becomes larger with increasing size of the display device 20. In addition, display unevenness is more likely to occur when the display portion 22 has an increased pixel density with miniaturization of the pixels 24 provided in the display portion 22 and thereby the characteristics of the display element, the transistor, and the like included in the pixel 24 vary more between the pixels 24. According to one embodiment of the present invention, display unevenness displayed on the display portion 22 can be less noticeable. As described above, one embodiment of the present invention makes it possible to increase the size of the display device 20 while inhibiting display unevenness from being seen in an image displayed on the display portion 22. Furthermore, it is possible to increase the density of the pixels 24 provided in the display portion 22 and display a high-resolution image on the display portion 22 while inhibiting display unevenness from being seen in the image displayed on the display portion 22.

As described above, poor characteristics, deterioration, or the like of the display element, the transistor, or the like included in the pixel 24 sometimes gives rise to the pixel 24 that causes a bright spot or the pixel 24 that causes a dark spot. Here, a bright spot is more noticeable than a dark spot when an image displayed on the display portion 22 is seen, so that such a bright spot exerts a large adverse effect on the visibility. According to one embodiment of the present invention, the bright spot correction portion 50 and the like correct a bright spot to darken the bright spot, for example, allowing the display portion 22 to display a high-quality image. Note that the correction of a bright spot can also be performed by the machine learning processing portion 23.

In the image processing system 10 having the structure shown in FIG. 1, the learning portion 46 having a function of generating the machine learning model MLM can be provided in the generator 40, and the machine learning processing portion 23 having a function of performing processing using the machine learning model MLM can be provided in the display device 20. This enables the display device 20 to perform processing using the machine learning model MLM even when the display device 20 does not generate the machine learning model MLM. Generating the machine learning model MLM necessitates use of many pieces of the learning image data $LG_{IN}$, many pieces of the learning image data $LG_{GEN}$, and the like and needs a high arithmetic capacity. By providing the learning portion 46 in the generator 40 as described above, the arithmetic capacity of the display device 20 can be made lower than that of the generator 40.

<Method for Generating Machine Learning Model>

A method for generating the machine learning model MLM is described below with reference to drawings. It is assumed that the m rows and n columns of pixels 24 are arranged in a matrix in the display portion 22 as shown in FIG. 2A. It is assumed that the grayscale value of image data is an 8-bit digital value and a smaller grayscale value means a lower luminance of the light emitted from the pixel 24. For example, in the case where the grayscale value can be an integer of 0 to 255, the luminance of the light emitted from the pixel 24 is lowest when the grayscale value is 0.

[Method for Generating Table]

Figure 4:
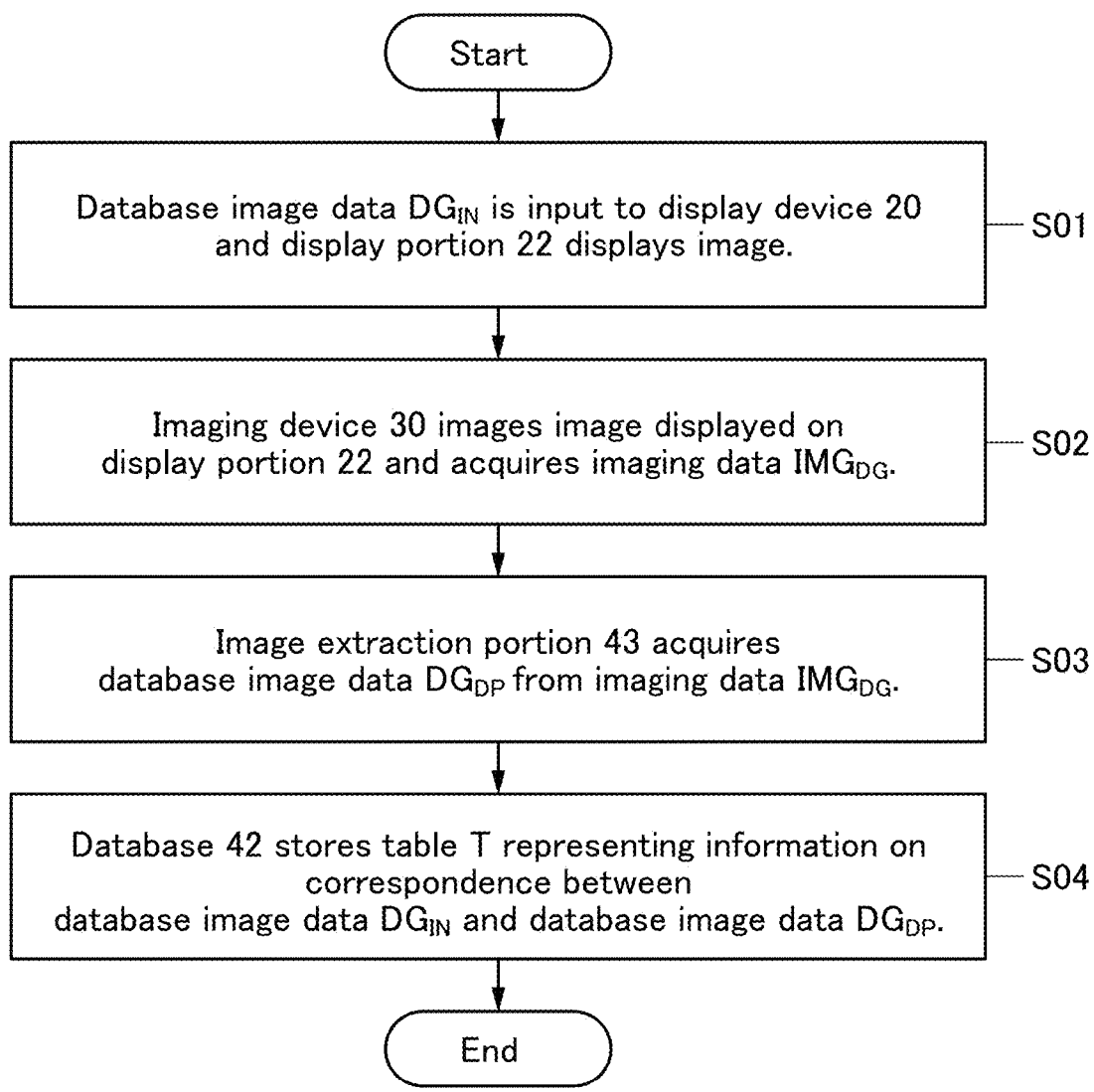
FIG. 4 is a flowchart showing an example of a method for generating a table.

FIG. 4 is a flowchart showing an example of a method for generating the table T to be stored in the database 42. As shown in FIG. 4, the table T is generated by a method shown by Step S01 to Step S04. FIG. 5A and FIG. 5B and FIG. 6A and FIG. 6B are schematic views showing operations in Step S01 to Step S04.

To generate the table T, first, the database image data $DG_{IN}$ is input to the input portion 21 of the display device 20. The database image data $DG_{IN}$ input to the input portion 21 is input to the display portion 22, and the display portion 22 displays an image corresponding to the database image data $DG_{IN}$ (Step S01). Specifically, the pixels 24 emit light with luminances corresponding to the m rows and n columns of first grayscale values of the database image data $DG_{IN}$, so that the display portion 22 displays the image.

Figure 5A:
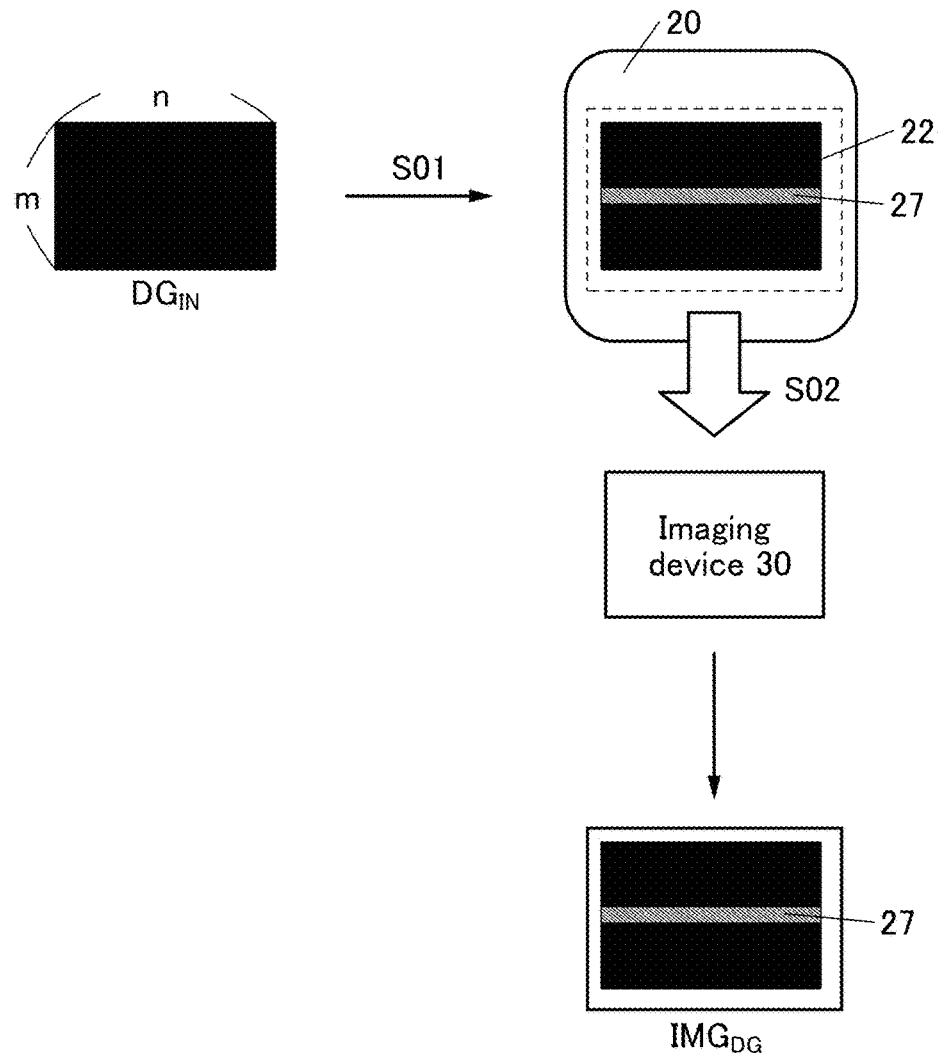
FIG. 5A and FIG. 5B are schematic views showing an example of a method for generating a table.

In FIG. 5A, the database image data $DG_{IN}$ is assumed to represent an image having the same luminance throughout the entire screen. In other words, it is assumed that all the pixels 24 emit light with the same luminance. By contrast, in the image displayed on the display portion 22, the luminance of the light emitted from some of the pixels 24 is different from the luminance of the light emitted from the pixels 24 in another portion. That is, display unevenness occurs. The display unevenness that occurs is denoted as display unevenness 27 in FIG. 5A.

Next, the image capturing device 30 performs image capturing of the image displayed on the display portion 22. The image capturing device 30 thus acquires the image capturing data $IMG_{DG}$ (Step S02).

Here, in the case where the image capturing device 30 performs image capturing of the image displayed on the display portion 22 of the display device 20, image capturing of an object other than the display portion 22 might be performed. For example, image capturing of the housing of the display device 20 is performed in some cases. In FIG. 5A, the image capturing data $IMG_{DG}$ is assumed to include a portion surrounded by the dashed line in the display device 20 shown in FIG. 5A.

Figure 5B:
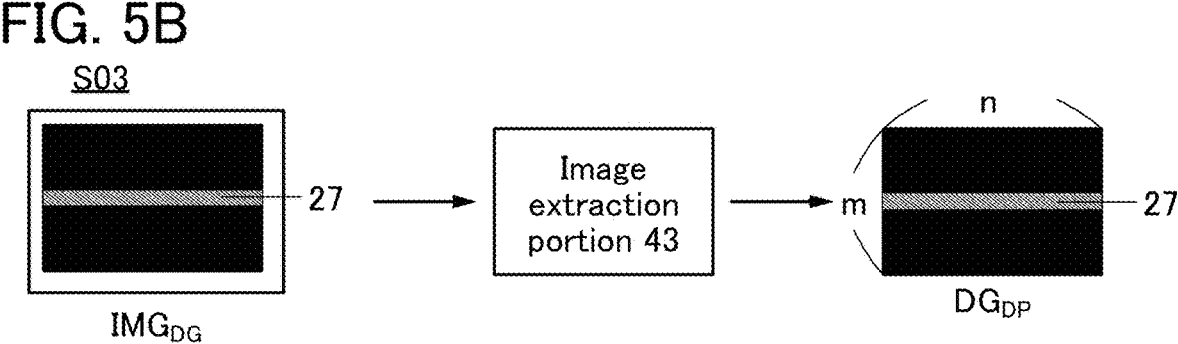

Then, the image extraction portion 43 acquires the database image data $DG_{DP}$ from the image capturing data $IMG_{DG}$ (Step S03). Specifically, data on a portion representing the image displayed on the display portion 22 is extracted from the image capturing data $IMG_{DG}$. For example, in the case where the image capturing data $IMG_{DG}$ includes the housing of the display device 20 in addition to the image displayed on the display portion 22 as shown in FIG. 5B, the data on the portion representing the image displayed on the display portion 22 is extracted from the image capturing data $IMG_{DG}$, and data on a portion representing the housing of the display device 20 is eliminated. Thus, the database image data $DG_{DP}$ is acquired. The extraction of data from the image capturing data $IMG_{DG}$ can be performed by pattern matching, template matching, or the like as described above.

As described above, it is preferable that the resolution of an image represented by the database image data $DG_{IN}$ be equal to the resolution of an image represented by the database image data $DG_{DP}$. For example, in the case where the database image data $DG_{IN}$ has m rows and n columns of the first grayscale values, the database image data $DG_{DP}$ preferably has m rows and n columns of the second grayscale values. However, in the case where the data on the portion representing the image displayed on the display portion 22 is extracted from the image capturing data $IMG_{DG}$, for example, the extracted data does not necessarily have m rows and n columns of grayscale values. For example, the extracted data has less than m rows of grayscale values in some cases and has more than m rows of grayscale values in other cases. The extracted data has less than n columns of grayscale values in some cases and has more than n columns of grayscale values in other cases.

In the case where the data extracted from the image capturing data $IMG_{DG}$ does not have m rows and n columns of grayscale values as described above, it is preferable that the image extraction portion 43 perform upconversion or downconversion on the data such that the database image data $DG_{DP}$ output from the image extraction portion 43 has m rows and n columns of the second grayscale values. For example, in the case where the data extracted by the image extraction portion 43 from the image capturing data $IMG_{DG}$ has less than m rows of grayscale values or less than n columns of grayscale values, the image extraction portion 43 can perform upconversion on the data extracted from the image capturing data $IMG_{DG}$. In the case where the data extracted by the image extraction portion 43 from the image capturing data $IMG_{DG}$ has more than m rows of grayscale values or more than n columns of grayscale values, the image extraction portion 43 can perform downconversion on the data extracted from the image capturing data $IMG_{DG}$. In this manner, the number of rows and the number of columns of the second grayscale values included in the database image data $DG_{DP}$ can be equal to the number of rows and the number of columns of the first grayscale values included in the database image data $DG_{IN}$, i.e., m rows and n columns. Note that upconversion and downconversion can be performed by a nearest-neighbor method, a bilinear method, a bicubic method, or the like as described above.

Then, the database 42 stores the table T representing information on correspondence between the database image data $DG_{IN}$ and the database image data $DG_{DP}$ (Step S04). Specifically, the table T represents information on correspondence between the first grayscale values of the database image data $DG_{IN}$ and the second grayscale values of the database image data $DG_{DP}$, as described above. The table T represents, for example, the first grayscale values and the second grayscale values at the coordinates corresponding to the coordinates of the first grayscale values. For example, the table T represents the first grayscale values and the second grayscale values at the same coordinates as the first grayscale values.

Figure 6A:
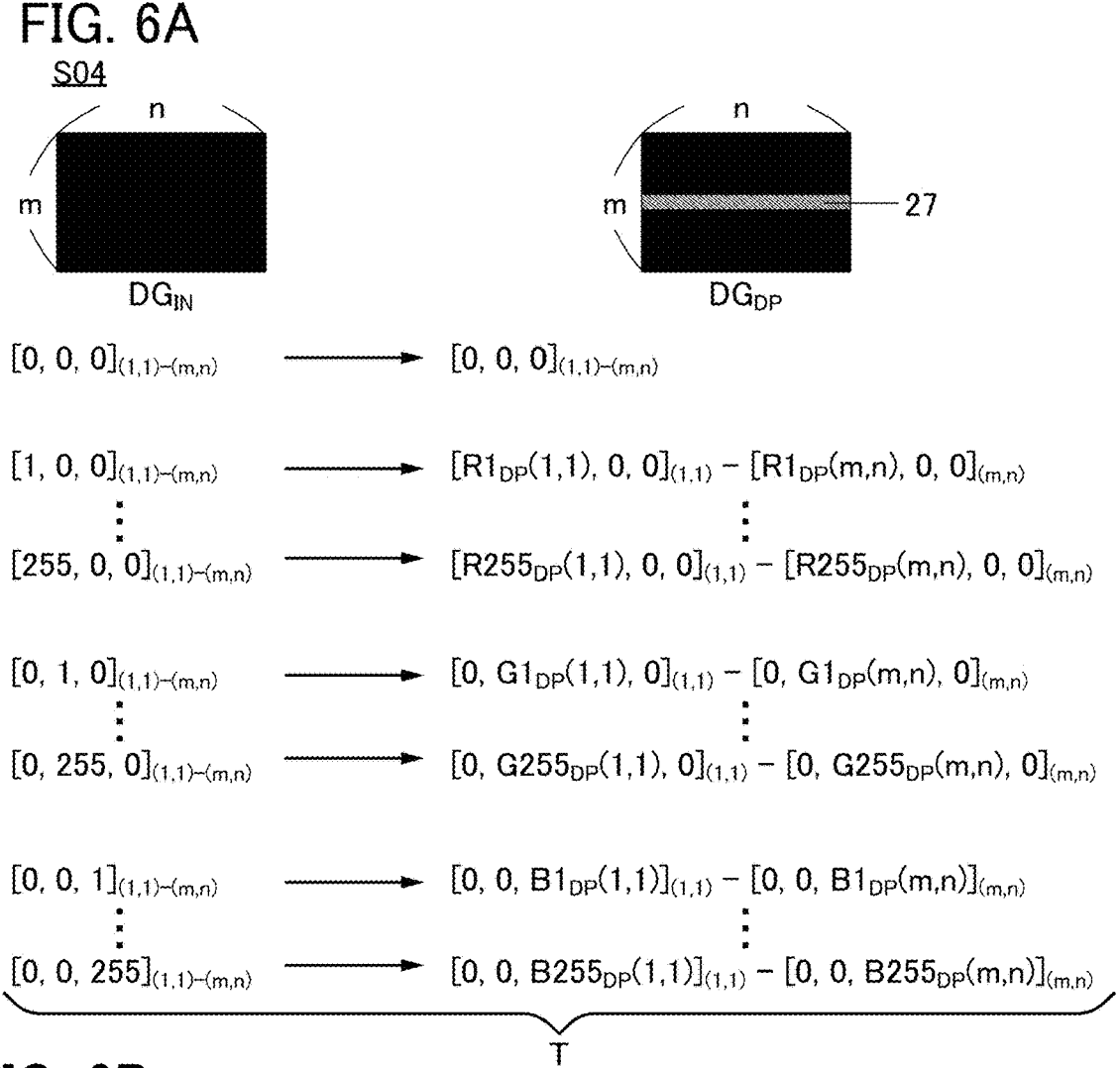
FIG. 6A and FIG. 6B are schematic views showing examples of a method for generating a table.

FIG. 6A is a diagram showing an example of the table T. In FIG. 6A, the first grayscale values of the database image data $DG_{IN}$ are shown on the left side of the arrows, and the second grayscale values of the database image data $DG_{DP}$ are shown on the right side of the arrows.

Here, the pixels 24 are assumed to have a function of emitting red light, green light, and blue light. In this case, the image data has a grayscale value representing the luminance of red light (red grayscale value), a grayscale value representing the luminance of green light (green grayscale value), and a grayscale value representing the luminance of blue light (blue grayscale value). Furthermore, for example, [R, G, B]$_{(i,j)}$ refers to the red grayscale value, the green grayscale value, and the blue grayscale value being respectively R, G, and B in the i-th row and the j-th column. Moreover, for example, [R, G, B]$_{(1,1)-(m,n)}$ refers to the red grayscale value, the green grayscale value, and the blue grayscale value being respectively R, G, and B in the first row and the first column through the m-th row and the n-th column, i.e., every red grayscale value, every green grayscale value, and every blue grayscale value being respectively R, G, and B. Note that the light emitted by the pixels 24 is not limited to red light, green light, and blue light. For example, the pixels 24 may emit white light. The pixels 24 may emit cyan light, magenta light, and yellow light. The pixels 24 do not necessarily emit one of red light, green light, and blue light. In addition, the number of colors of the light emitted by the pixels 24 is not limited to three; for example, the pixels 24 may emit light of one color or two colors or may emit light of four or more colors.

The values of R, G, and B can each be an integer of 0 to 255 in the case where the red grayscale value, the green grayscale value, and the blue grayscale value are each 8-bit digital data. Here, when it is assumed that a smaller grayscale value means a lower luminance of the light emitted from the pixel 24, a grayscale value of 0 can mean that no light is emitted. Thus, for example, $[0, 0, 0]_{(1,1)-(m,n)}$ can mean that none of the pixels 24 emits any of red light, green light, and blue light.

Accordingly, it can be assumed that none of the pixel 24(1,1) to the pixel 24(m,n) emits light when the first grayscale values of the database image data $DG_{IN}$ are $[0, 0, 0]_{(1,1)-(m,n)}$. Thus, the second grayscale values of the database image data $DG_{DP}$ can also be $[0, 0, 0]_{(1,1)-(m,n)}$.

In a method for generating a machine learning model with the use of the image processing system 10, pieces of the database image data $DG_{IN}$ whose first grayscale values are $[1, 0, 0]_{(1,1)-(m,n)}$ to $[255, 0, 0]_{(1,1)-(m,n)}$ are input to the display device 20 to acquire the second grayscale values of the database image data $DG_{DP}$. Pieces of the database image data $DG_{IN}$ whose first grayscale values are $[0, 1, 0]_{(1,1)-(m,n)}$ to $[0, 255, 0]_{(1,1)-(m,n)}$ are input to the display device 20 to acquire the second grayscale values of the database image data $DG_{DP}$. Pieces of the database image data $DG_{IN}$ whose first grayscale values are $[0, 0, 1]_{(1,1)-(m,n)}$ to $[0, 0, 255]_{(1,1)-(m,n)}$ are input to the display device 20 to acquire the second grayscale values of the database image data $DG_{DP}$. In other words, the image represented by the database image data $DG_{IN}$ can have a single color and the same luminance throughout the entire screen.

In this specification and the like, the term "single color" means a color expressed by emission of light of one color by a pixel. For example, in the case where a pixel has a function of emitting red light, green light, and blue light, a single color image refers to a red image, a green image, and a blue image.

In this specification and the like, in the case where the red grayscale value in the i-th row and the j-th column of the database image data $DG_{IN}$ is 1, for example, the corresponding red grayscale value of the database image data $DG_{DP}$ is referred to as $R1_{DP}(i,j)$. In addition, in the case where the red grayscale value in the i-th row and the j-th column of the database image data $DG_{IN}$ is 255, for example, the corresponding red grayscale value of the database image data $DG_{DP}$ is referred to as $R255_{DP}(i,j)$. Furthermore, in the case where the green grayscale value in the i-th row and the j-th column of the database image data $DG_{IN}$ is 1, for example, the corresponding green grayscale value of the database image data $DG_{DP}$ is referred to as $G1_{DP}(i,j)$. Furthermore, in the case where the green grayscale value in the i-th row and the j-th column of the database image data $DG_{IN}$ is 255, for example, the corresponding green grayscale value of the database image data $DG_{DP}$ is referred to as $G255_{DP}(i,j)$. Furthermore, in the case where the blue grayscale value in the i-th row and the j-th column of the database image data $DG_{IN}$ is 1, for example, the corresponding blue grayscale value of the database image data $DG_{DP}$ is referred to as $B1_{DP}(i,j)$. Furthermore, in the case where the blue grayscale value in the i-th row and the j-th column of the database image data $DG_{IN}$ is 255, for example, the corresponding blue grayscale value of the database image data $DG_{DP}$ is referred to as $B255_{DP}(i,j)$.

Here, the first grayscale values are not necessarily the same as the second grayscale values corresponding to the first grayscale values. For example, even when the first grayscale values of the database image data $DG_{IN}$ are $[128, 0, 0]_{(1,1)-(m,n)}$, not all of $R128_{DP}(1,1)$ to $R128_{DP}(m,n)$ are necessarily 128. Any of $R128_{DP}(1,1)$ to $R128_{DP}(m,n)$ may be larger or smaller than 128. Moreover, $R128_{DP}(1,1)$ to $R128_{DP}(m,n)$ do not necessarily have the same value, for example. That is, display unevenness or the like might occur in the image represented by the database image data $DG_{DP}$ as described above.

Note that the database image data $DG_{IN}$ is not necessarily input to the display device 20 for all the grayscale values to acquire the second grayscale values of the database image data $DG_{DP}$. For example, the database image data $DG_{IN}$ with some grayscale values among the grayscale values $[1, 0, 0]_{(1,1)-(m,n)}$ to $[255, 0, 0]_{(1,1)-(m,n)}$ may be input to the display device 20 to acquire the second grayscale values of the database image data $DG_{DP}$. The database image data $DG_{IN}$ with some grayscale values among the grayscale values $[0, 1, 0]_{(1,1)-(m,n)}$ to $[0, 1, 0]_{(1,1)-(m,n)}$ may be input to the display device 20 to acquire the second grayscale values of the database image data $DG_{DP}$. The database image data $DG_{IN}$ with some grayscale values among the grayscale values $[0, 0, 225]_{(1,1)-(m,n)}$ to $[0, 0, 255]_{(1,1)-(m,n)}$ may be input to the display device 20 to acquire the second grayscale values of the database image data $DG_{DP}$.

As described above, in the case where the database image data $DG_{IN}$ with some grayscale values is input to the display device 20 to acquire the second grayscale values of the database image data $DG_{DP}$, the second grayscale value of the database image data $DG_{DP}$ corresponding to the database image data $DG_{IN}$ with a grayscale value not input to the display device 20 can be calculated in accordance with the first grayscale values of the database image data $DG_{IN}$ input to the display device 20 and the second grayscale values corresponding to the first grayscale values. The calculation can be performed by proportional interpolation, for example. Furthermore, the calculation can be performed using a predetermined formula.

For example, it is assumed that the database image data $DG_{DP}$ with grayscale values $[127, 0, 0]_{(1,1)-(m,n)}$ and the database image data $DG_{DP}$ with $[129, 0, 0]_{(1,1)-(m,n)}$ are input to the display device 20, whereas the database image data $DG_{DP}$ with grayscale values $[128, 0, 0]_{(1,1)-(m,n)}$ is not input to the display device 20. Furthermore, for example, it is assumed that $R128_{DP}(i,j)$ is calculated by proportional interpolation between $R127_{DP}(i,j)$ and $R129_{DP}(i,j)$ with the value of $R127_{DP}(i,j)$ and the value of $R129_{DP}(i,j)$ being respectively 120 and 124. In this case, the value of $R128_{DP}(i,j)$ can be 122. A green grayscale value and a blue grayscale value can also be calculated by a similar method.

When the database image data $DG_{IN}$ is input to the display device 20 for some grayscale values, the number of times of arithmetic operations necessary for generating the table T can be small. Accordingly, the table T can be generated in a short time.

Figure 6B:
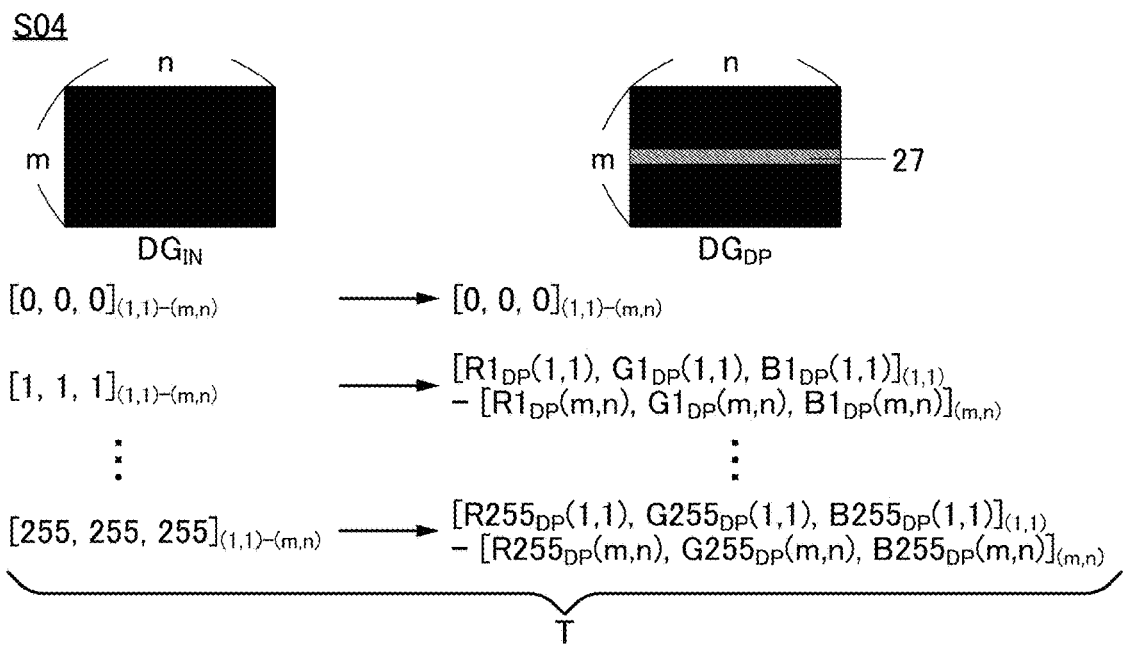

In FIG. 6A, the database image data $DG_{IN}$ represents an image having a single color throughout the entire screen. That is, the red grayscale values, the green grayscale values, and the blue grayscale values of the database image data $DG_{IN}$ and the database image data $DG_{DP}$ are separately acquired. However, one embodiment of the present invention is not limited thereto. FIG. 6B is a modification example of FIG. 6A and is different from FIG. 6A in that the red grayscale values, the green grayscale values, and the blue grayscale values of the database image data $DG_{IN}$ and the database image data $DG_{DP}$ are acquired at a time.

In the case shown in FIG. 6B, pieces of the database image data $DG_{IN}$ whose first grayscale values are [0, 0, 0]$_{(1,1)-(m,n)}$ to [255, 255, 255]$_{(1,1)-(m,n)}$ are input to the display device 20 to acquire the second grayscale values of the database image data $DG_{DP}$. That is, the image represented by the database image data $DG_{IN}$ is an image (white image) whose red grayscale value, green grayscale value, and blue grayscale value are the same, and the red grayscale value, the green grayscale value, and the blue grayscale value of the database image data $DG_{DP}$ are acquired. The grayscale values acquired are represented by the table T. Specifically, the table T represents the red grayscale value of the database image data $DG_{IN}$ and the red grayscale value of the database image data $DG_{DP}$ at the coordinates corresponding to the coordinates of the red grayscale value of the database image data $DG_{IN}$. The table T represents the green grayscale value of the database image data $DG_{IN}$ and the green grayscale value of the database image data $DG_{DP}$ at the coordinates corresponding to the coordinates of the green grayscale value of the database image data $DG_{IN}$. The table T represents the blue grayscale value of the database image data $DG_{IN}$ and the blue grayscale value of the database image data $DG_{DP}$ at the coordinates corresponding to the coordinates of the blue grayscale value of the database image data $DG_{IN}$. The table T represents, for example, the red grayscale value of the database image data $DG_{IN}$ and the red grayscale value of the database image data $DG_{DP}$ at the same coordinates as the red grayscale value of the database image data $DG_{IN}$. The table T represents, for example, the green grayscale value of the database image data $DG_{IN}$ and the green grayscale value of the database image data $DG_{DP}$ at the same coordinates as the green grayscale value of the database image data $DG_{IN}$. The table T represents, for example, the blue grayscale value of the database image data $DG_{IN}$ and the blue grayscale value of the database image data $DG_{DP}$ at the same coordinates as the blue grayscale value of the database image data $DG_{IN}$.

When the database image data $DG_{IN}$ represents a white image, the number of pieces of the database image data $DG_{IN}$ input to the display device 20 can be small. Accordingly, the number of times of arithmetic operations necessary for generating the table T can be small. Thus, the table T can be generated in a short time. Note that the red grayscale value, the green grayscale value, and the blue grayscale value of the database image data $DG_{IN}$ are not necessarily the same; the grayscale value of one color among the red grayscale value, the green grayscale value, and the blue grayscale value of the database image data $DG_{IN}$ may be different from the grayscale value of the other colors. The red grayscale value, the green grayscale value, and the blue grayscale value of the database image data $DG_{IN}$ may be different from one another.

[Method for Generating Machine Learning Model]

Figure 7:
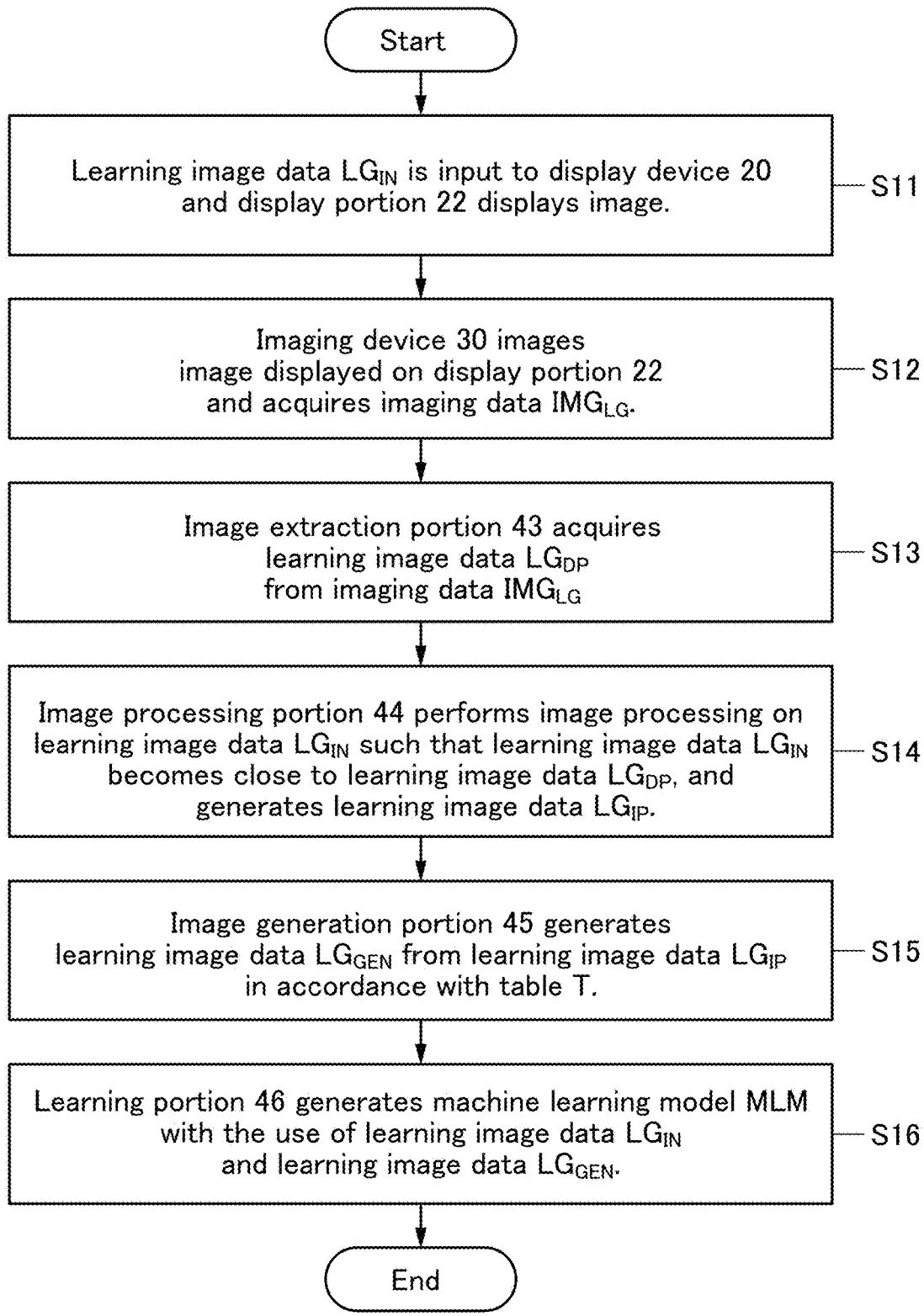
FIG. 7 is a flowchart showing an example of a method for generating a machine learning model.

FIG. 7 is a flowchart showing an example of a method for generating the machine learning model MLM with the use of the table T stored in the database 42. As shown in FIG. 7, the machine learning model MLM is generated by a method shown by Step S11 to Step S16. FIG. 8A, FIG. 8B, FIG. 9A, FIG. 9B, and FIG. 10 are schematic views showing operations in Step S11 to Step S16.

Figure 8A:
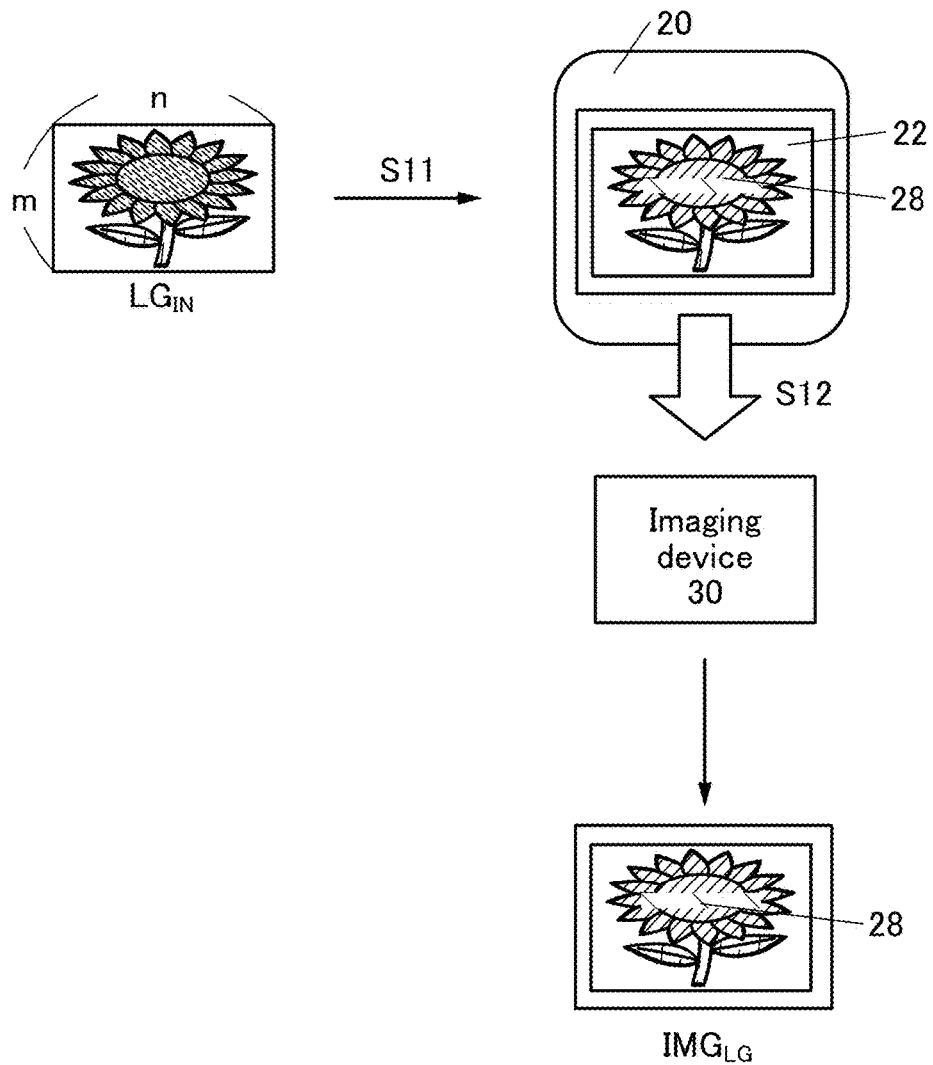
FIG. 8A and FIG. 8B are schematic views showing an example of a method for generating a machine learning model.
Figure 8B:
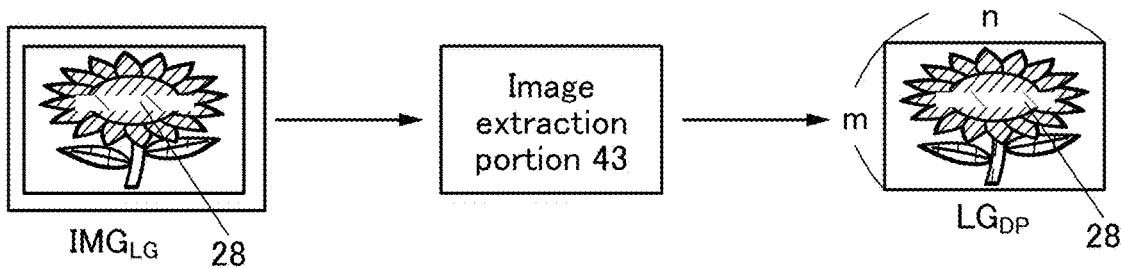

To generate the machine learning model MLM, first, the learning image data $LG_{IN}$ is input to the input portion 21 of the display device 20. The learning image data $LG_{IN}$ input to the input portion 21 is input to the display portion 22, and the display portion 22 displays an image corresponding to the learning image data $LG_{IN}$ (Step S11). Specifically, the pixels 24 emit light with luminances corresponding tom rows and n columns of grayscale values of the learning image data $LG_{IN}$, so that the display portion 22 displays the image. FIG. 8A shows a state where display unevenness 28 occurs in the image displayed on the display portion 22.

Next, the image capturing device 30 performs image capturing of the image displayed on the display portion 22. Thus, the image capturing device 30 acquires the image capturing data $IMG_{LG}$ (Step S12).

As described above, in the case where the image capturing device 30 performs image capturing of the image displayed on the display portion 22 of the display device 20, image capturing of an object other than the display portion 22 might be performed. For example, image capturing of the housing of the display device 20 is performed in some cases. In FIG. 8A, the image capturing data $IMG_{LG}$ is assumed to include a portion surrounded by the dashed line in the display device 20 shown in FIG. 8A.

Then, the image extraction portion 43 acquires the learning image data $LG_{DP}$ from the image capturing data $IMG_{LG}$ (Step S13). The description of the operation in Step S03 can be referred to for the operation in Step S13 by replacing the image capturing data $IMG_{LG}$ with the image capturing data $IMG_{LG}$, replacing the database image data $DG_{DP}$ with the learning image data $LG_{DP}$, and replacing FIG. 5B with FIG. 8B.

Figure 9A:
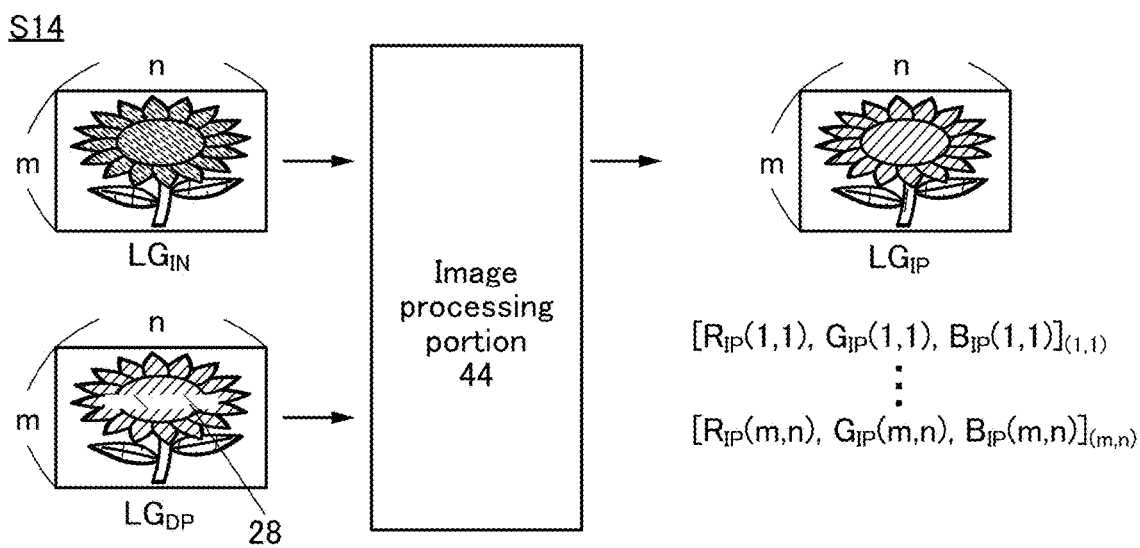
FIG. 9A and FIG. 9B are schematic views showing an example of a method for generating a machine learning model.

Then, the image processing portion 44 performs image processing on the learning image data $LG_{IN}$ such that the learning image data $LG_{IN}$ becomes close to the learning image data $LG_{DP}$. Accordingly, the image processing portion 44 generates the learning image data $LG_{IP}$ (Step S14). FIG. 9A shows examples of the learning image data $LG_{IN}$ and the learning image data $LG_{DP}$ input to the image processing portion 44 and the learning image data $LG_{IP}$ output from the image processing portion 44.

For example, the learning image data $LG_{IP}$ can be generated by converting the grayscale values of the learning image data $LG_{IN}$ by image processing in a manner to make the difference between the sum of the grayscale values of the learning image data $LG_{IP}$ and the sum of the grayscale values of the learning image data $LG_{DP}$ smaller than the difference between the sum of the grayscale values of the learning image data $LG_{IP}$ and the sum of the grayscale values of the learning image data $LG_{IN}$. For example, the learning image data $LG_{IP}$ can be generated by converting the grayscale values of the learning image data $LG_{IN}$ by image processing in a manner to make the sum of the grayscale values of the learning image data $LG_{IP}$ equal to the sum of the grayscale values of the learning image data $LG_{DP}$.

The learning image data $LG_{IP}$ can be generated by converting the grayscale values of the learning image data $LG_{IN}$ by image processing in a manner to make the PSNR or SSIM with respect to the learning image data $LG_{DP}$ larger than the PSNR or SSIM with respect to the learning image data $LG_{IN}$, for example. The learning image data $LG_{IP}$ can be generated by converting the grayscale values of the learning image data $LG_{IN}$ by image processing in a manner to maximize the PSNR or SSIM with respect to the learning image data $LG_{DP}$, for example.

As described above, the image processing performed by the image processing portion 44 can be gamma correction, for example. In this case, the above image processing can be performed by setting a gamma value to an appropriate value.

Here, the image processing portion 44 preferably performs the image processing for the learning image data $LG_{IN}$ on a color basis. Specifically, a gamma value is preferably calculated on a color basis in the case of performing gamma correction for the learning image data $LG_{IN}$, for example. For example, the red grayscale values of the learning image data $LG_{IN}$ are preferably converted by image processing in a manner to make the difference between the sum of the red grayscale values of the learning image data $LG_{IP}$ and the sum of the red grayscale values of the learning image data $LG_{DP}$ smaller than the difference between the sum of the red grayscale values of the learning image data $LG_{IP}$ and the sum of the red grayscale values of the learning image data $LG_{IN}$. The green grayscale values of the learning image data $LG_{IN}$ are preferably converted by image processing in a manner to make the difference between the sum of the green grayscale values of the learning image data $LG_{IP}$ and the sum of the green grayscale values of the learning image data $LG_{DP}$ smaller than the difference between the sum of the green grayscale values of the learning image data $LG_{IP}$ and the sum of the green grayscale values of the learning image data $LG_{IN}$. The blue grayscale values of the learning image data $LG_{IN}$ are preferably converted by image processing in a manner to make the difference between the sum of the blue grayscale values of the learning image data $LG_{IP}$ and the sum of the blue grayscale values of the learning image data $LG_{DP}$ smaller than the difference between the sum of the blue grayscale values of the learning image data $LG_{IP}$ and the sum of the blue grayscale values of the learning image data $LG_{IN}$. For example, the red grayscale values of the learning image data $LG_{IN}$ are preferably converted by image processing in a manner to make the sum of the red grayscale values of the learning image data $LG_{IP}$ equal to the sum of the red grayscale values of the learning image data $LG_{DP}$. The green grayscale values of the learning image data $LG_{IN}$ are preferably converted by image processing in a manner to make the sum of the green grayscale values of the learning image data Lap equal to the sum of the green grayscale values of the learning image data $LG_{DP}$. Furthermore, the blue grayscale values of the learning image data $LG_{IN}$ are preferably converted by image processing in a manner to make the sum of the blue grayscale values of the learning image data $LG_{IP}$ equal to the sum of the blue grayscale values of the learning image data $LG_{DP}$.

As described above, "the sum of the grayscale values of the learning image data $LG_{IP}$" may be, for example, the sum of all the m rows and n columns of grayscale values of the learning image data $LG_{IP}$ or the sum of some of the grayscale values. "The sum of the grayscale values of the learning image data LG" may be, for example, the sum of all the m rows and n columns of grayscale values of the learning image data $LG_{IN}$ or the sum of some of the grayscale values. "The sum of the grayscale values of the learning image data $LG_{DP}$" may be, for example, the sum of all the m rows and n columns of grayscale values of the learning image data $LG_{DP}$ or the sum of some of the grayscale values.

In this specification and the like, the red grayscale value in the i-th row and the j-th column of the learning image data $LG_{IP}$ is referred to as $R_{IP}(i,j)$. The green grayscale value in the i-th row and the j-th column of the learning image data $LG_{IP}$ is referred to as $G_{IP}(i,j)$. Furthermore, the blue grayscale value in the i-th row and the j-th column of the learning image data $LG_{IP}$ is referred to as $B_{IP}(i,j)$.

As described above, the image represented by the learning image data $LG_{IP}$ output from the image processing portion 44 is close to the learning image data $LG_{DP}$. Meanwhile, the image represented by the learning image data $LG_{IN}$ on which the image processing portion 44 performs image processing does not include the display unevenness 28, so that the image represented by the learning image data $LG_{IP}$ does not include the display unevenness 28, either.

Figure 9B:
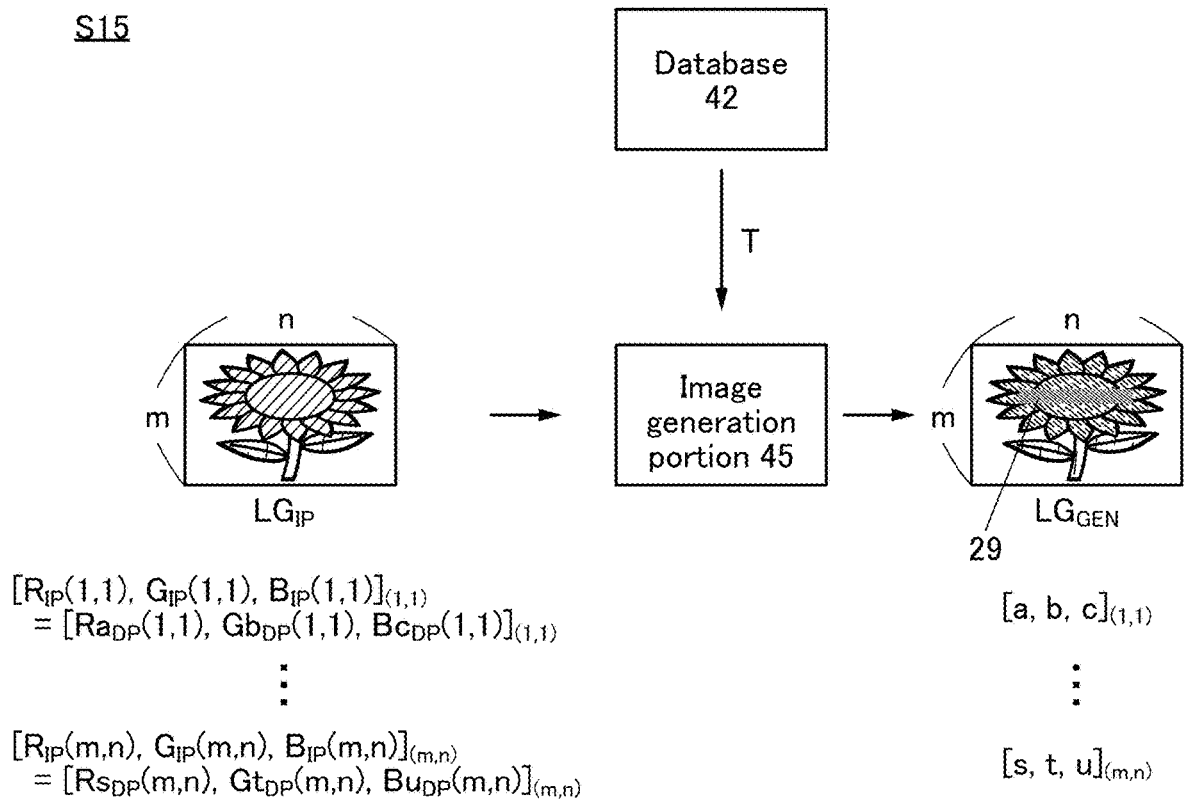

Subsequently, in accordance with the table T, the image generation portion 45 generates the learning image data $LG_{GEN}$ from the learning image data $LG_{IP}$ (Step S15). FIG. 9B shows a state where the table T and the learning image data $LG_{IP}$ are input to the image generation portion 45 and the learning image data $LG_{GEN}$ is output.

Specifically, first, the second grayscale values included in the table T are selected in accordance with the grayscale values of the learning image data $LG_{IP}$. For example, the second grayscale value that is the value matching a grayscale value of the learning image data $LG_{IP}$ or the value closest thereto is selected for each of the first row and the first column through the m-th row and the n-th column. Specifically, the red grayscale value that is the value matching $R_{IP}(i,j)$ or the value closest thereto is selected from $R0_{DP}(i,j)$ to $R255_{DP}(i,j)$, for example. The green grayscale value that is the value matching $G_{IP}(i,j)$ or the value closest thereto is selected from $G0_{DP}(i,j)$ to $G255_{DP}(i,j)$, for example. The blue grayscale value that is the value matching $B_{IP}(i,j)$ or the value closest thereto is selected from $B0_{DP}(i,j)$ to $B255_{DP}(i,j)$, for example. Note that the selected second grayscale value in the first row and the first column is $[Ra_{DP}(1,1), Gb_{DP}(1,1), Bc_{DP}(1,1)]_{(1,1)}$ (a, b, and c are each an integer of greater than or equal to 0 and less than or equal to 255) in FIG. 9B. The selected second grayscale value in the m-row and the n-th column is $[Rs_{DP}(m,n), Gt_{DP}(m,n), Bu_{DP}(m,n)]_{(m,n)}$ (s, t, and u are each an integer of greater than or equal to 0 and less than or equal to 255).

Then, the image generation portion 45 generates the learning image data $LG_{GEN}$ that is image data including the first grayscale values corresponding to the selected second grayscale values, in accordance with the table T. Specifically, the image generation portion 45 generates the learning image data $LG_{GEN}$ that is image data including the first grayscale values in the first row and the first column through the m-th row and the n-th column corresponding to the selected second grayscale values in the first row and the first column through the m-th row and the n-th column, for example. In the example shown in FIG. 9B, for example, the red grayscale value in the first row and the first column in the learning image data $LG_{GEN}$ is a, the green grayscale value therein is b, and the blue grayscale value therein is c. The red grayscale value in the m-th row and the n-th column is s, the green grayscale value therein is t, and the blue grayscale value therein is u.

In the case where the table T does not include the second grayscale value in the i-th row and the j-th column matching the grayscale value in the i-th row and the j-th column of the learning image data $LG_{IP}$, for example, the second grayscale value in the i-th row and the j-th column is not necessarily selected. In this case, the grayscale value in the i-th row and the j-th column of the learning image data $LG_{GEN}$ can be the same as the grayscale value in the i-th row and the j-th column of the learning image data $LG_{IP}$. Specifically, in the case where $R0_{DP}(i,j)$ to $R255_{DP}(i,j)$ do not include any red grayscale value matching $R_{IP}(i,j)$, for example, the red grayscale value in the i-th row and the j-th column of the learning image data $LG_{GEN}$ can be $R_{IP}(i,j)$. In the case where $G0_{DP}(i,j)$ to $G255_{DP}(i,j)$ do not include any green grayscale value matching $G_{IP}(i,j)$, for example, the green grayscale value in the i-th row and the j-th column of the learning image data $LG_{GEN}$ can be $G_{IP}(i,j)$. Furthermore, in the case where $B0_{DP}(i,j)$ to $B255_{DP}(i,j)$ do not include any blue grayscale value matching $B_{IP}(i,j)$, for example, the blue grayscale value in the i-th row and the j-th column of the learning image data $LG_{GEN}$ can be $B_{IP}(i,j)$.

As described above, the image represented by the learning image data $LG_{IP}$ does not include display unevenness and the like. By contrast, the database image data $DG_{DP}$ with the second grayscale values includes display unevenness or the like. The database image data $DG_{IN}$ with the first grayscale values does not include display unevenness or the like. Accordingly, the learning image data $LG_{GEN}$ that is the image data including the first grayscale values corresponding to the second grayscale values selected in accordance with the grayscale values of the learning image data $LG_{IP}$ can be image data such that the display unevenness or the like appearing in the learning image data $LG_{DP}$ is canceled. FIG. 9B and the like show a state where the data such that the display unevenness 28 is canceled is added to the data corresponding to a region 29 in the learning image data $LG_{GEN}$. For example, in the case where the luminance of a portion in which the display unevenness 28 occurs is higher than that of a peripheral portion of the portion, the luminance of the region 29 can be made lower than that of the peripheral portion of the region 29.

Figure 10:
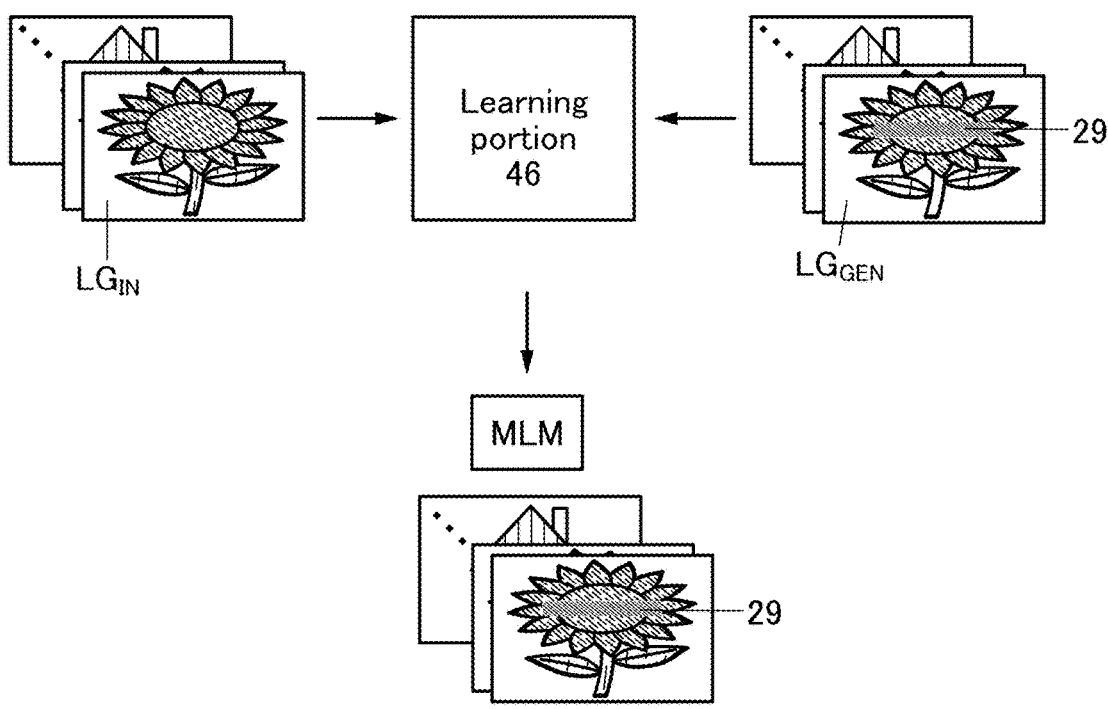
FIG. 10 is a schematic view showing an example of a method for generating a machine learning model.

After Step S15, the learning portion 46 generates the machine learning model MLM with the use of the learning image data $LG_{IN}$ and the learning image data $LG_{GEN}$ (Step S16). For example, the learning portion 46 generates the machine learning model MLM such that image data output when the learning image data $LG_{IN}$ is input matches the learning image data $LG_{GEN}$. The machine learning model MLM can be generated by supervised learning using the learning image data $LG_{IN}$ and the learning image data $LG_{GEN}$ as teacher data, for example. FIG. 10 shows a state where the learning image data $LG_{IN}$ and the learning image data $LG_{GEN}$ are input to the learning portion 46 and the machine learning model MLM is generated such that the image data output from the learning portion 46 is the same as the learning image data $LG_{GEN}$. As described above, a neural network model can be used as the machine learning model MLM, for example.

The above is an example of a method for generating the machine learning model MLM with the use of the image processing system 10. As described above, by performing the image processing on the image data input to the input portion 21 with the use of the machine learning model MLM, the machine learning processing portion 23 can generate image data such that the display unevenness is canceled. When the image data output from the machine learning processing portion 23 is input to the display portion 22, the display portion 22 can display an image in which display unevenness is less noticeable. Thus, as described above, it is possible to increase the size of the display device 20 while inhibiting display unevenness from being seen in an image displayed on the display portion 22. Furthermore, it is possible to increase the density of the pixels 24 provided in the display portion 22 and display a high-resolution image on the display portion 22 while inhibiting display unevenness from being seen in the image displayed on the display portion 22.

Performing image processing using the machine learning model MLM can cancel not only display unevenness as described above but also a factor in reducing the image quality of the image to be displayed. For example, a line defect, a point defect, and the like can be canceled. Thus, the display portion 22 can display high-quality images.

Here, the display portion 22 can display an image in which display unevenness or the like is less noticeable even in the case where image data is input to the input portion 21 and image data generated by the image generation portion 45 through processing similar to that in Step S11 to Step S15 is input to the display portion 22. However, performing Step S11 to Step S15 requires a high arithmetic capacity. By contrast, the image processing using the machine learning model MLM that has been generated can be performed with an arithmetic capacity lower than that for Step S11 to Step S15. Thus, image processing can be performed in a short time when the image processing is performed using the machine learning model MLM. In addition, image processing can be performed in the display device 20 without using a device with a high arithmetic capacity such as a server.

The image processing for making display unevenness less noticeable that is performed on the image data input to the input portion 21 may be performed by a method similar to that in Step S11 to Step S15 without using the machine learning model MLM in the case where the image processing can be performed with a device with a high arithmetic capacity, for example. Furthermore, the image processing for making display unevenness less noticeable that is performed on the image data input to the input portion 21 may be performed by a method similar to that in Step S11 to Step S15 without using the machine learning model MLM in the case where the display device 20 has a sufficiently high arithmetic capacity, for example. In the case where image processing is performed without using the machine learning model MLM, the generator 40 can have a structure without the learning portion 46.

<Bright Spot Correction Method>

A bright spot correction method that is an image processing method of one embodiment of the present invention is described below with reference to drawings.

Figure 11A:
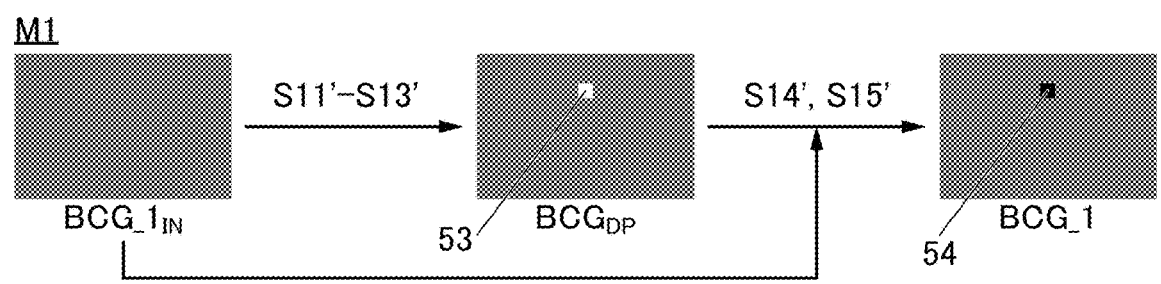
FIG. 11A and FIG. 11B are schematic views showing examples of an image processing method.
Figure 11B:
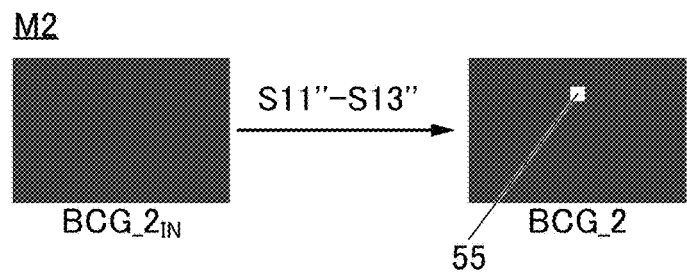

In a bright spot correction method of one embodiment of the present invention, the pixel 24 causing a bright spot is detected and then, the pixel 24 detected is subjected to correction. FIG. 11A and FIG. 11B are diagrams showing examples of a method for detecting the pixel 24 causing a bright spot. Here, the method shown in FIG. 11A is a method M1, and the method shown in FIG. 11B is a method M2. It is assumed that there is no display unevenness and the like in FIG. 11A and FIG. 11B.

In the method M1, first, bright spot correction image data $BCG\_1_{IN}$ is input to the input portion 21 of the display device 20. Subsequently, operations similar to those in Step S11 to Step S15 shown in FIG. 7 and the like are performed with the learning image data $LG_{IN}$ being replaced with the bright spot correction image data $BCG\_1_{IN}$, the image capturing data $IMG_{LG}$ being replaced with the image capturing data $IMG_{BCG}$, the learning image data $LG_{DP}$ being replaced with the bright spot correction image data $BCG_{DP}$, the learning image data $LG_{IP}$ being replaced with the bright spot correction image data $BCG_{IP}$, and the learning image data $LG_{GEN}$ being replaced with the bright spot correction image data BCG_1 (Step S11' to Step S15'). For example, in Step S11' and Step S12', the display portion 22 displays an image corresponding to the bright spot correction image data $BCG\_1_{IN}$, and the image capturing device 30 performs image capturing of the image displayed on the display portion 22, so that the image capturing data $IMG_{BCG}$ is acquired. The bright spot correction image data $BCG_{DP}$ acquired in Step S13' can have m rows and n columns of grayscale values. Moreover, in Step S15', the image generation portion 45 generates the bright spot correction image data BCG_1 from the bright spot correction image data $BCG_{IP}$ in accordance with the table T representing information on the correspondence between the first grayscale values of the database image data $DG_{IN}$ and the second grayscale values of the database image data $DG_{DP}$. Note that the operation shown in Step S14' is not performed in the case where the bright spot correction image data $BCG_{DP}$ is supplied not to the image processing portion 44 but to the image generation portion 45. In this case, the image generation portion 45 generates the bright spot correction image data BCG_1 from the bright spot correction image data $BCG_{DP}$ in Step S15'.

Here, in the case where the pixel 24(1,1) to the pixel 24(m,n) include a pixel causing a bright spot, the grayscale value at the coordinates corresponding to the coordinates of the pixel 24 causing a bright spot among the m rows and n columns of grayscale values of the bright spot correction image data $BCG_{DP}$, e.g., the grayscale value at the same coordinates as the pixel 24 causing a bright spot, is high. For example, the grayscale value at the coordinates corresponding to the coordinates of the pixel 24 causing a bright spot is 255 or close to 255 in the case where the grayscale values of the bright spot correction image data $BCG_{DP}$ can each be any integer value of 0 to 255. Here, in the case where the grayscale value at coordinates in the bright spot correction image data $BCG_{DP}$ is higher than the grayscale value at coordinates around the coordinates, the bright spot correction image data BCG_1 can have a lower grayscale value.

After Step S15', the bright spot correction portion 50 of the display device 20 detects, in accordance with the bright spot correction image data BCG_1, bright spot coordinates that are the coordinates of the pixel 24 causing a bright spot. Specifically, the bright spot coordinates can be the coordinates of a grayscale value smaller than or equal to a threshold value among m rows and n columns of the grayscale values of the bright spot correction image data BCG_1. Note that the bright spot coordinates may be detected by the generator 40. The bright spot coordinates may be detected by, for example, the image generation portion 45 of the generator 40.

Here, to detect the bright spot coordinates with high accuracy, the difference between the grayscale value at the bright spot coordinates and the grayscale value at coordinates around the bright spot coordinates is preferably large in both the bright spot correction image data $BCG_{DP}$ and the bright spot correction image data BCG_1. Accordingly, the grayscale values of the bright spot correction image data $BCG\_1_{IN}$ are preferably halftones. For example, all the m rows and n columns of grayscale values of the bright spot correction image data $BCG\_1_{IN}$ are preferably 127 or close to 127. FIG. 11A shows an example in which all the grayscale values of the bright spot correction image data $BCG\_1_{IN}$ are the same halftone value and the bright spot correction image data $BCG_{DP}$ includes, as a bright spot, a grayscale value 53 higher than the grayscale values therearound. In the example shown in FIG. 11A, a grayscale value 54 at the same coordinates as the grayscale value 53 among the grayscale values of the bright spot correction image data BCG_1 can be lower than the grayscale values therearound.

In the method M2, first, bright spot correction image data $BCG\_2_{IN}$ is input to the input portion 21 of the display device 20. Subsequently, operations similar to those in Step S11 to Step S13 shown in FIG. 7 and the like are performed with the learning image data $LG_{IN}$ being replaced with the bright spot correction image data $BCG\_2_{IN}$, the image capturing data $IMG_{LG}$ being replaced with the image capturing data $IMG_{BCG}$, the learning image data $LG_{DP}$ being replaced with the bright spot correction image data BCG_2 (Step S11" to Step S13"). For example, in Step S11" and Step S12", the display portion 22 displays an image corresponding to the bright spot correction image data $BCG\_2_{IN}$, and the image capturing device 30 performs image capturing of the image displayed on the display portion 22, so that the image capturing data $IMG_{BCG}$ is acquired. The bright spot correction image data BCG_2 acquired in Step S13" can have m rows and n columns of grayscale values.

Here, in the case where the pixel 24(1,1) to the pixel 24(m,n) include a pixel causing a bright spot, the grayscale value at the coordinates corresponding to the coordinates of the pixel 24 causing a bright spot among the m rows and n columns of grayscale values of the bright spot correction image data BCG_2, e.g., the grayscale value at the same coordinates as the pixel 24 causing a bright spot, is high. For example, the grayscale value at the coordinates corresponding to the coordinates of the pixel 24 causing a bright spot is 255 or close to 255 in the case where the grayscale values of the bright spot correction image data BCG_2 can each be any integer value of 0 to 255.

After Step S13", the bright spot correction portion 50 of the display device 20 detects, in accordance with the bright spot correction image data BCG_2, bright spot coordinates that are the coordinates of the pixel 24 causing a bright spot. Specifically, the bright spot coordinates can be the coordinates of a grayscale value larger than or equal to a threshold value among the m rows and n columns of grayscale values of the bright spot correction image data BCG_2. Note that the bright spot coordinates may be detected by the generator 40. The bright spot coordinates may be detected by, for example, the image extraction portion 43 of the generator 40.

Here, to detect the bright spot coordinates with high accuracy, the difference between the grayscale value at the bright spot coordinates and the grayscale value around the bright spot coordinates is preferably large in the bright spot correction image data BCG_2. By contrast, the bright spot coordinates sometimes cannot be detected with high accuracy when too small grayscale values of the image data input to the display portion 22 inhibit the pixel 24 that would cause a bright spot depending on the grayscale values from causing a bright spot. The grayscale values of the bright spot correction image data $BCG\_2_{IN}$ are preferably determined in view of the above. For example, all the m rows and n columns of grayscale values of the bright spot correction image data $BCG\_2_{IN}$ are preferably larger than or equal to 0 and smaller than or equal to 127, larger than or equal to 31 and smaller than or equal to 127, or larger than or equal to 63 and smaller than or equal to 127. FIG. 11B shows an example in which the bright spot correction image data BCG_2 includes, as a bright spot, a grayscale value 55 higher than the grayscale values therearound.

The bright spot correction portion 50 can have a function of correcting a bright spot by detecting bright spot coordinates. For example, among m rows and n columns of the grayscale values of the content image data $CG_{ML}$, the grayscale value at the coordinates corresponding to bright spot coordinates, e.g., the coordinates that are the same as the bright spot coordinates, can be small and can be 0, for example. The bright spot correction portion 50 generates the content image data $CG_{COR}$ in which the grayscale value at the coordinates corresponding to the bright spot coordinates is made small and supplies the content image data $CG_{COR}$ to the display portion 22, so that the pixel 24 causing a bright spot can be changed into a dark spot, for example. As described above, a bright spot is more noticeable than a dark spot when an image displayed on the display portion 22 is seen, so that such a bright spot exerts a large adverse effect on the visibility. Thus, when the display portion 22 displays the image corresponding to the content image data $CG_{COR}$, the image displayed on the display portion 22 can have high quality.

Figure 12A:
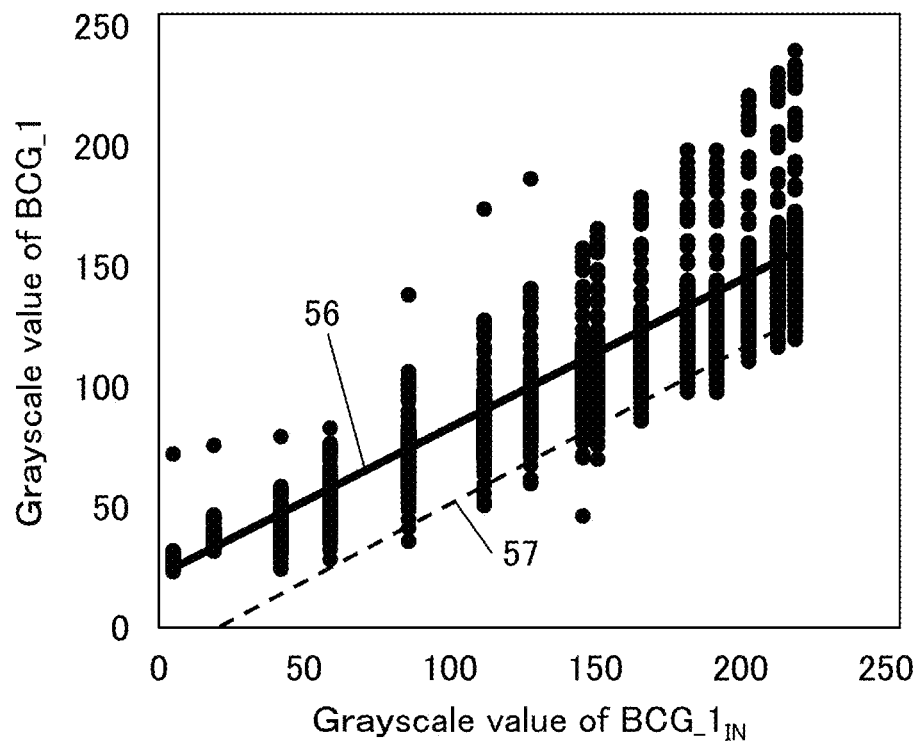
FIG. 12A and FIG. 12B are graphs showing an example of an image processing method.

FIG. 12A is a graph showing the relation between measured values of the grayscale values of the bright spot correction image data BCG_1 and the grayscale values of the bright spot correction image data $BCG\_1_{IN}$, and the graph can be created by the method M1. Here, the grayscale values of the bright spot correction image data $BCG\_1_{IN}$ are the same throughout the entire screen. In FIG. 12A, there are a plurality of plots for the same grayscale value of the bright spot correction image data $BCG\_1_{IN}$ because the measured values of the grayscale values of the bright spot correction image data BCG_1 are plotted for a plurality of coordinates.

A line 56 shown in FIG. 12A indicates the average of the plotted grayscale values of the bright spot correction image data BCG_1 at the grayscale values of the bright spot correction image data $BCG\_1_{IN}$. As shown in FIG. 12A, the relation between the average of the grayscale values of the bright spot correction image data BCG_1 and the grayscale values of the bright spot correction image data $BCG\_1_{IN}$ can be linearly approximated.

Here, as described above, the grayscale value at the bright spot coordinates in the bright spot correction image data BCG_1 is lower than the grayscale values at coordinates other than the bright spot coordinates. Accordingly, a threshold value is set for each grayscale value of the bright spot correction image data $BCG\_1_{IN}$, and the coordinates of the grayscale value smaller than the threshold value among the m rows and n columns of grayscale values of the bright spot correction image data BCG_1 can be the bright spot coordinates, for example. In FIG. 12A, a threshold value is denoted by a line 57. The slope of the line 57 can be expressed by a positive linear expression.

In the method M1, when a plurality of pieces of the bright spot correction image data $BCG\_1_{IN}$ with different grayscale values are prepared and the bright spot correction image data BCG_1 is generated for each piece of the bright spot correction image data $BCG\_1_{IN}$, the coordinates of the pixel 24 causing a bright spot can be inhibited from being determined not to be bright spot coordinates and the coordinates of the pixel 24 not causing a bright spot can be inhibited from being determined to be bright spot coordinates. Thus, the bright spot correction portion 50 and the like can detect bright spot coordinates with high accuracy.

Figure 12B:
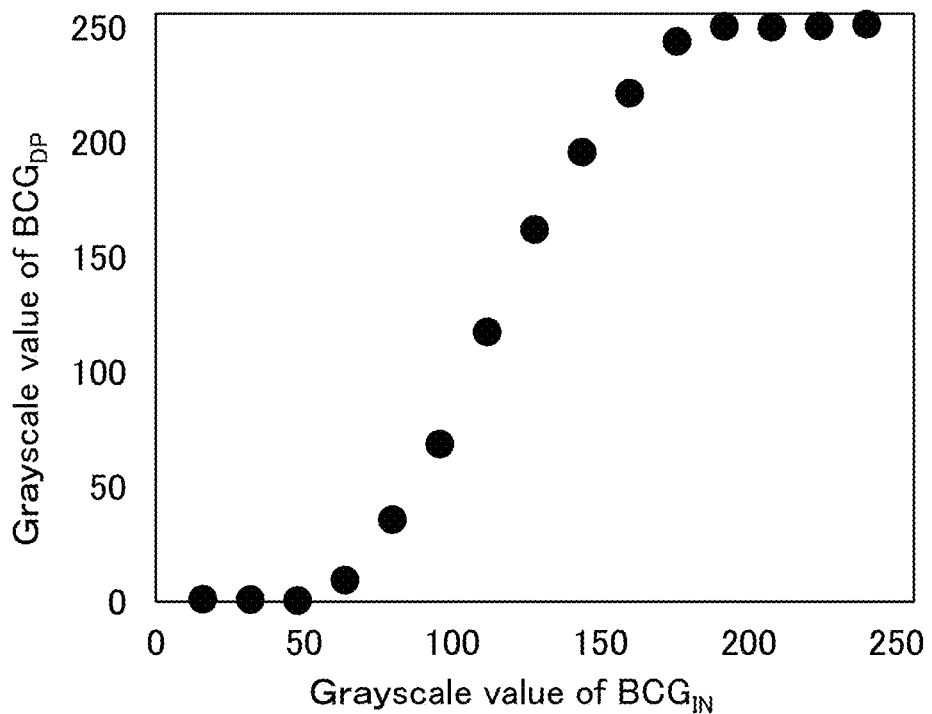

FIG. 12B is a graph showing the relation between measured values of the grayscale values of the bright spot correction image data $BCG_{DP}$ generated by the image extraction portion 43 and the grayscale values of the bright spot correction image data $BCG_{IN}$ input to the input portion 21. As shown in FIG. 12B, the relation between the grayscale values of the bright spot correction image data $BCG_{DP}$ and the grayscale values of the bright spot correction image data $BCG_{IN}$ cannot be linearly approximated but is approximated by a sigmoid curve, for example.

Next, an example of the pixel 24 that can be detected by the method M2 is described. FIG. 13A1 and FIG. 13A2 are each a graph showing the relation between the grayscale values of the bright spot correction image data BCG_2 and the grayscale values of the bright spot correction image data BCG_21 N.

A graph 61 shown in FIG. 13A1 can be, for example, the relation between the average value of the m rows and n columns of grayscale values of the bright spot correction image data BCG_2 and the grayscale values of the bright spot correction image data $BCG\_2_{IN}$ during manufacture of the display device 20. Note that the grayscale values of the bright spot correction image data $BCG\_2_{IN}$ can be the same throughout the entire screen, for example. Here, it is assumed that some of the grayscale values of the bright spot correction image data BCG_2 exhibit the behavior indicated by a graph 63. In other words, it is assumed that increased grayscale values of the image data input to the display portion 22 result in reduced luminances of the light emitted from some of the pixels 24. It is also assumed that the pixel 24 exhibiting the behavior indicated by the graph 63 easily deteriorates and the behavior changes into that indicated by a graph 63A in FIG. 13A2 owing to long-term use of the pixel 24, i.e., long-term voltage supply to the display element of the pixel 24, for example. It is assumed that by contrast, the pixel 24 exhibiting the behavior indicated by the graph 61 does not easily deteriorate or does not exhibit the behavior indicated by the graph 63A even after long-term use.

It can be said that the pixel 24 exhibiting the behavior indicated by the graph 63A causes a bright spot. Thus, the pixel 24 exhibiting the behavior indicated by the graph 63 in FIG. 13A1 does not cause a bright spot during manufacture of the display device 20, for example, but is likely to cause a bright spot owing to use of the display device 20. As described above, a bright spot caused by the pixel 24 exerts a large adverse effect on the visibility. It is thus preferable that the pixel 24 exhibiting the behavior indicated by the graph 63 in FIG. 13A1 be darkened by reducing the voltage supplied to the display element, for example. In this manner, the pixel 24 can be inhibited from causing a bright spot, so that the display device 20 can have increased reliability.

FIG. 13B is a diagram showing an example of a method for detecting the pixel 24 that exhibits the behavior indicated by the graph 63. It is assumed that the bright spot correction image data $BCG\_2_{IN}$ has high grayscale values as shown in FIG. 13B. For example, all the m rows and n columns of grayscale values of the bright spot correction image data $BCG\_2_{IN}$ are 255 or close to 255. When Step S11" to Step S13" are performed in accordance with this bright spot correction image data $BCG\_2_{IN}$, the grayscale value that corresponds to the pixel 24 exhibiting the behavior indicated by the graph 63 among the grayscale values of the bright spot correction image data BCG_2 becomes lower than the grayscale values therearound. FIG. 13B shows an example in which the bright spot correction image data BCG_2 includes a grayscale value 65 lower than the grayscale values therearound. The pixel 24 corresponding to the grayscale value 65 can be the pixel 24 exhibiting the behavior indicated by the graph 63, i.e., the pixel 24 causing a bright spot owing to long-term use.

Thus, the method M2 makes it possible to detect not only the pixel 24 that has caused a bright spot but also the pixel 24 that is likely to cause a bright spot owing to use of the display device 20. By contrast, in the method M1, the grayscale value that corresponds to the pixel 24 exhibiting the behavior indicated by the graph 63 among the grayscale values of the bright spot correction image data BCG_1 is higher than the grayscale values therearound. Thus, the pixel 24 exhibiting the behavior indicated by the graph 63 is difficult to detect when the bright spot correction image data $BCG\_1_{IN}$ input to the input portion 21 has higher grayscale values. On the other hand, when the bright spot correction image data $BCG\_1_{IN}$ input to the input portion 21 has lower grayscale values, the graph 63 becomes close to the graph 61, making it difficult to detect the pixel 24 exhibiting the behavior indicated by the graph 63. Thus, the pixel 24 exhibiting the behavior indicated by the graph 63 is difficult to detect by the method M1.

Accordingly, performing both the method M1 and the method M2 makes it possible not only to detect the pixel 24 causing a bright spot with high accuracy but also to detect the pixel 24 that is likely to cause a bright spot owing to use of the display device 20, for example. In this manner, performing both the method M1 and the method M2 makes it possible to comprehensively detect the pixels 24 that should be darkened, for example.

Figure 14:
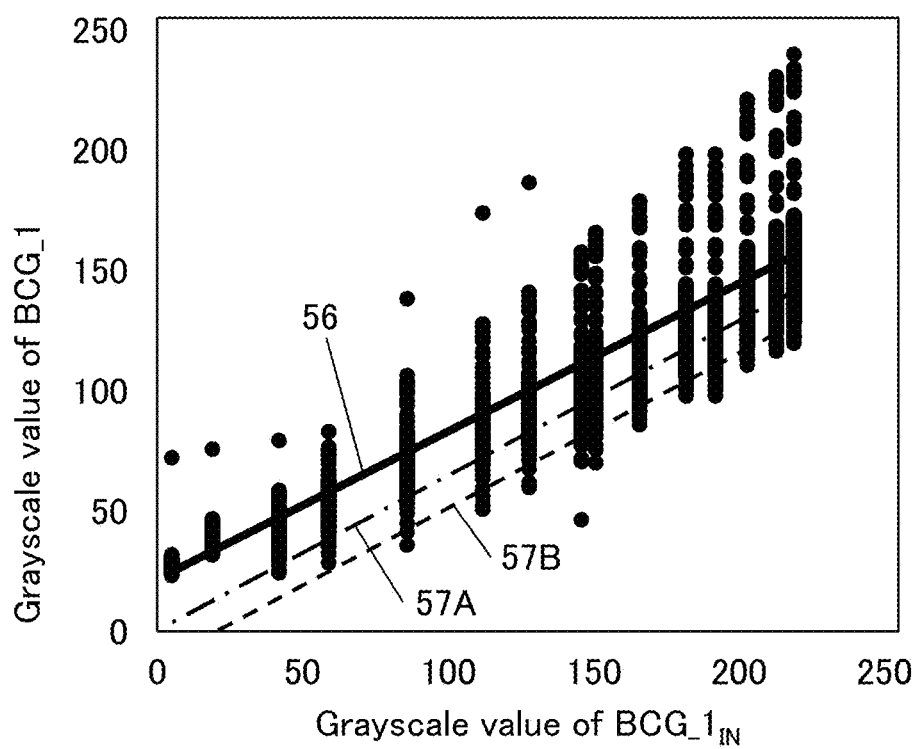
FIG. 14 is a graph showing an example of an image processing method.

FIG. 14 is a graph showing the relation between measured values of the grayscale values of the bright spot correction image data BCG_1 and the grayscale values of the bright spot correction image data BCG_1$_{IN}$, and the graph is different from the graph shown in FIG. 12A in including a line 57A and a line 57B instead of the line 57.

Among the grayscale values of the bright spot correction image data BCG_1 in FIG. 14, the grayscale value indicated by the line 57A is a first threshold value and the grayscale value indicated by the line 57B is a second threshold value. The first threshold value is smaller than the value indicated by the line 56, and the second threshold value is smaller than the first threshold value. The slope of each of the line 57A and the line 57B can be expressed by a positive linear expression like that of the line 57.

An example of an image processing method using the image processing system 10 is described with reference to FIG. 14. First, the graph shown in FIG. 14 is created by the method M1. In the graph shown in FIG. 14, for example, the coordinates of a grayscale value smaller than or equal to the first threshold value and larger than or equal to the second threshold value among the m rows and n columns of grayscale values of the bright spot correction image data BCG_1 are first bright spot coordinates. The coordinates of a grayscale value smaller than the second threshold value are second bright spot coordinates.

Bright spot coordinates are detected by the method M2. The bright spot coordinates are third bright spot coordinates.

Then, in the case where the content image data CG$_{ML}$ is input to the bright spot correction portion 50, the grayscale value at the coordinates that are the same as both the first bright spot coordinates and the third bright spot coordinates among the m rows and n columns of grayscale values of the content image data CG$_{ML}$ is made small, for example. Furthermore, the grayscale value at the coordinates that are the same as the second bright spot coordinates is made small regardless of whether the coordinates are the same as the third bright spot coordinates, for example. In this manner, a bright spot can be corrected and the display portion 22 can display a high-quality image.

When image processing is performed by the above method, for example, it is possible to inhibit darkening of the pixel 24 that would exert few adverse effects on the visibility even when not being darkened. It is thus possible to inhibit a reduction of the quality of the image displayed on the display portion 22 due to darkening of the pixel 24. In the example shown in FIG. 14, the pixel 24 at the coordinates that are the same as the first bright spot coordinates but are different from the third bright spot coordinates among the m rows and n columns of pixels 24, for example, can be a pixel that would exert few adverse effects on the visibility even when not being darkened. It is thus possible to omit correction of the grayscale value at the coordinates that are the same as the first bright spot coordinates but are different from the third bright spot coordinates among the m rows and n columns of grayscale values of the content image data CG$_{ML}$, for example.

The above is an example of the bright spot correction method that is an image processing method of one embodiment of the present invention.

<Structure Example of Machine Learning Model>

Figure 15A:
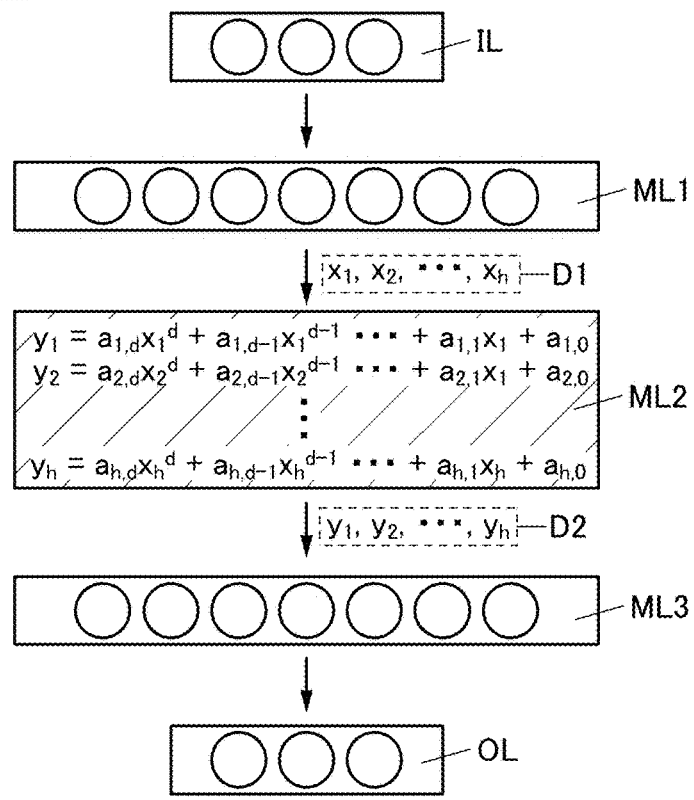
FIG. 15A is a diagram showing a structure example of a machine learning model.

FIG. 15A is a diagram showing a structure example of the machine learning model MLM. As shown in FIG. 15A, the machine learning model MLM can be a neural network model that includes an input layer IL, an intermediate layer ML1, an intermediate layer ML2, an intermediate layer ML3, and an output layer OL. The input layer IL, the intermediate layer ML1, the intermediate layer ML3, and the output layer OL include a plurality of layers constituted by neurons, and the neurons provided in each layer are connected to each other. To the input layer IL, image data can be input.

The number of matrices of m rows and n columns of the image data input to the input layer IL can be the same as the number of kinds of the subpixels included in the display portion 22. In the case where the pixel 24 includes a subpixel emitting red (R) light, a subpixel emitting green (G) light, and a subpixel emitting blue (B) light, for example, the image data includes a matrix of m rows and n columns having red grayscale values as components, a matrix of m rows and n columns having green grayscale values as components, and a matrix of m rows and n columns having blue grayscale values as components. That is, the image data can include three matrices.

When the image data includes a matrix as described above, the number of neurons included in the input layer IL can be the same as the number of components of the matrix. For example, in the case where the image data includes three matrices of 1200 rows and 1920 columns, the number of neurons included in the input layer IL can be 1920×1200×3. When the image data includes a matrix, the number of neurons included in the output layer OL can be the same as the number of components of the matrix. For example, in the case where the image data includes three matrices of 1200 rows and 1920 columns as described above, the number of neurons included in the output layer OL can be 1920×1200×3.

The intermediate layer ML1 has a function of generating data D1 to be supplied to the intermediate layer ML2. The data D1 can be a matrix having h components x (h is an integer of greater than or equal to 2).

In this specification and the like, the h components x are distinguished from each other by being referred to as a component $x_1$ to a component $x_h$, for example. The same description applies to other components.

The number of neurons included in the intermediate layer ML1 is set larger than the number of neurons included in the input layer IL. In this manner, the number of components of the data D1 can be larger than the number of components of the image data input to the input layer IL. Details of the arithmetic processing that can be performed by the intermediate layer ML1 are described later.

The intermediate layer ML2 has a function of converting the component x into a component y. For example, the intermediate layer ML2 has a function of converting the component $x_1$ to the component $x_h$ respectively into a component $y_1$ to a component $y_h$ by a nonlinear polyhomial single-variable function. An example of the function is shown below.

[Formula 1]

$$y_i = \sum_{k=0}^{d} a_{i,k} x_i^k \quad (1)$$

Here, i can be an integer of greater than or equal to 1 and less than or equal to h. The above formula is a function in which the component x is an independent variable, the component y is a dependent variable, and a is a coefficient. The function includes a term including the d-th power of x (d is an integer of greater than or equal to 2). It is assumed that in FIG. 15A, the intermediate layer ML2 performs the arithmetic processing expressed by the above formula.

Another example of the nonlinear polyhomial single-variable function is shown below.

[Formula 2]

$$y_i = \sum_{k=0}^{d} \{a_{i,k} \cos(kx_i) + b_{i,k} \sin(kx_i)\} \quad (2)$$

The above formula is a function in which x is an independent variable, y is a dependent variable, and a and b are coefficients. The function includes a term including a cosine of the component x and a term including a sine of the component x. Note that the function does not necessarily include the term including a cosine of the component x. The function does not necessarily include the term including a sine of the component x.

Thus, the intermediate layer ML2 can generate data having the component $y_1$ to the component $y_h$. This data is data D2. The data D2 can be a matrix like the data D1.

The intermediate layer ML3 has a function of generating data to be supplied to the output layer OL. The number of neurons included in the intermediate layer ML3 is set larger than the number of neurons included in the output layer OL. In this manner, the number of components of the image data output from the output layer OL can be smaller than the number of components of the data D2. Details of the arithmetic processing that can be performed by the intermediate layer ML3 are described later.

Note that two or more intermediate layers may be provided between the input layer IL and the intermediate layer ML2. Two or more intermediate layers may be provided between the intermediate layer ML2 and the output layer OL.

Figure 15B:
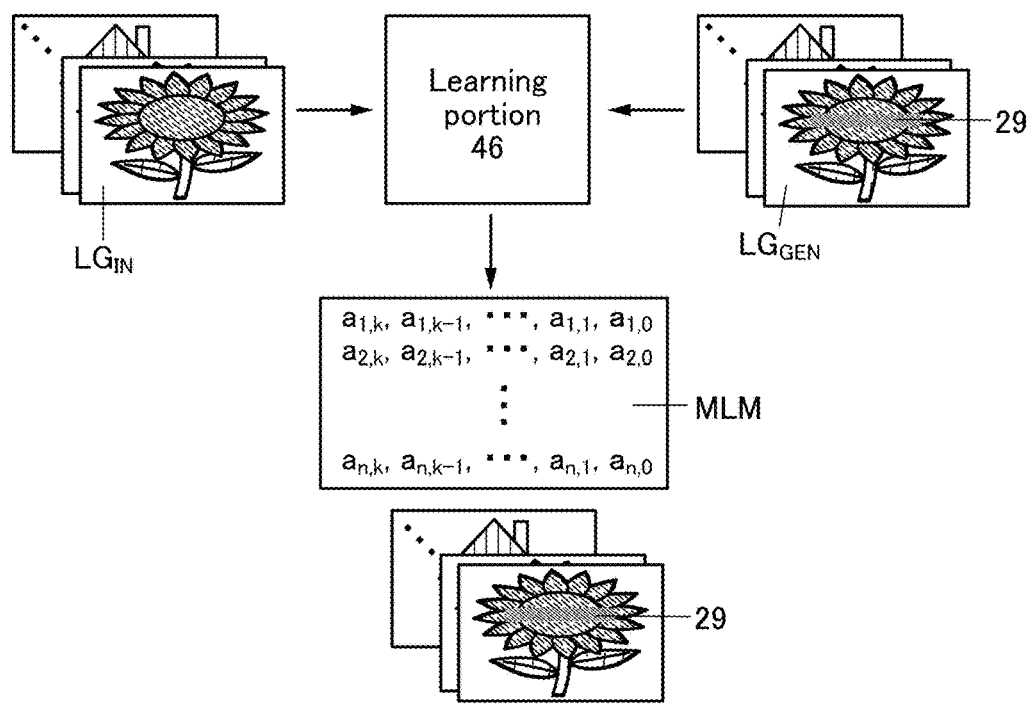
FIG. 15B is a schematic view showing an example of a learning method.

FIG. 15B is a diagram showing an example of a method for generating the machine learning model MLM in the case where the machine learning model MLM has the structure shown in FIG. 15A. As shown in FIG. 7, the machine learning model MLM is generated in Step S16. Thus, FIG. 15B can be regarded as a diagram showing an example of the operation in Step S16 in the case where the machine learning model MLM has the structure shown in FIG. 15A.

As described above, the machine learning model MLM can be generated by the learning portion 46. Specifically, the machine learning model MLM can be generated using, for example, the learning image data $LG_{IN}$ and the learning image data $LG_{GEN}$. For example, the learning portion 46 can generate the machine learning model MLM by acquiring values of a coefficient $a_{1,0}$ to a coefficient $a_{n,k}$ or the like by learning such that the image data output when the learning image data $LG_{IN}$ is input matches the learning image data $LG_{GEN}$. In the case where the intermediate layer ML2 performs the arithmetic operation expressed by Formula 2, the value of the coefficient b, as well as the value of the coefficient a, is acquired by learning.

Figure 16A:
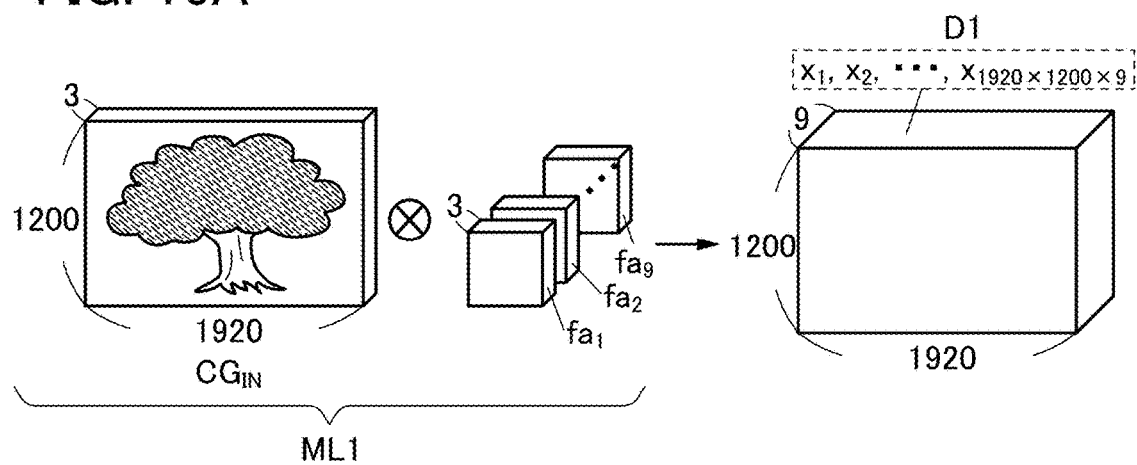
FIG. 16A and FIG. 16B are schematic views showing examples of arithmetic operations based on a machine learning model.
Figure 16B:
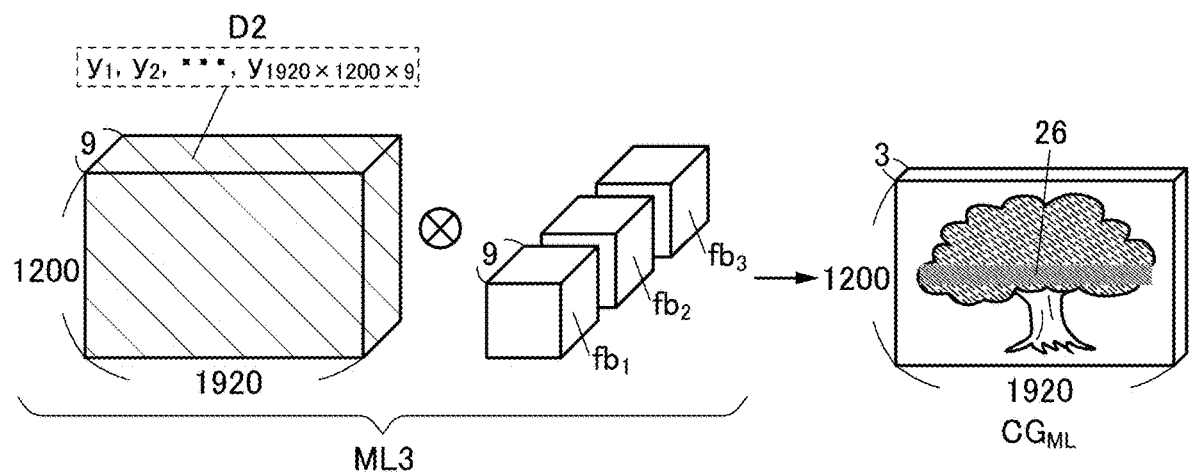

FIG. 16A and FIG. 16B are diagrams showing examples of arithmetic operations by the machine learning processing portion 23 employing the machine learning model MLM. As shown in FIG. 16A, the intermediate layer ML1 can perform a product-sum operation of the content image data $CG_{IN}$ and filters fa. Here, in the example shown in FIG. 16A, the content image data $CG_{IN}$ includes three matrices of 1200 rows and 1920 columns. That is, the content image data $CG_{IN}$ is data that has a width of 1920, a height of 1200, and the number of channels of 3. The intermediate layer ML1 performs a product-sum operation of the content image data $CG_{IN}$ and nine filters fa (a filter $fa_1$ to a filter $fa_4$) with the number of channels of the filter fa being 3. By performing such a product-sum operation, the intermediate layer ML1 can output the data D1 having a height of 1200, a width of 1920, and the number of channels of 9. The data D1 has the component $x_1$ to a component $x_{1920 \times 1200 \times 9}$.

The component $x_1$ to the component $x_{1920 \times 1200 \times 9}$ of the data D1 can be converted by the intermediate layer ML2 into the component $y_1$ to a component $y_{1920 \times 1200 \times 9}$ by Formula 1, Formula 2, or the like. The data having the component $y_1$ to the component $y_{1920 \times 1200 \times 9}$ is the data D2.

As shown in FIG. 16B, the intermediate layer ML3 can perform a product-sum operation of the data D2 and filters fb. Here, the data D2 can be data having a height of 1200, a width of 1920, and the number of channels of 9 like the data D1. The intermediate layer ML3 performs a product-sum operation of the data D2 and three filters fb (a filter $fb_1$ to a filter $fb_3$) with the number of channels of the filter fb being 9. By performing such a product-sum operation, the intermediate layer ML3 can output data having a width of 1920, a height of 1200, and the number of channels of 3. The data can be the content image data $CG_{ML}$.

In the above manner, for example, the content image data $CG_{IN}$ can be converted into the content image data $CG_{ML}$ with the use of the machine learning model MLM.

As described above, in the machine learning model MLM with the structure shown in FIG. 15A, the intermediate layer ML2 converts the component $x_1$ to the component $x_h$ of the data D1 respectively into the component $y_1$ to the component $y_h$ with the use of the nonlinear polynomial single-variable function. This makes the accuracy of the inference performed using the machine learning model MLM higher than that in the case where, for example, the component $x_1$ to the component $x_h$ are respectively converted into the component $y_1$ to the component $y_h$ using a linear single-variable function or a monomial single-variable function. In addition, the number of filters fa shown in FIG. 16A and the number of channels of the filters fb shown in FIG. 16B can be small, making small the amount of arithmetic operations for generation of the machine learning model MLM by learning and the inference based on the machine learning model MLM. Thus, the learning and inference can be performed at a high speed.

EXAMPLE

In this example, results of performing learning for acquiring the machine learning model MLM shown in FIG. 15A are described.

In this example, the machine learning model MLM was generated by supervised learning that used image data having a width of 1920, a height of 1200, and the number of channels of 3 as learning data and correct data. The component x of the data D1 was converted by the intermediate layer ML2 into the component y with the use of Formula 1, Formula 2, or Formula "y=ax+b". In Formula 1 and Formula 2, d=5.

It was assumed that the intermediate layer ML1 performed the arithmetic operation shown in FIG. 16A and the intermediate layer ML3 performed the arithmetic operation shown in FIG. 16B. It was assumed that in the case where the component x of the data D1 was converted into the component y with the use of Formula 1 or Formula 2, the intermediate layer ML1 performed a product-sum operation of the image data and the filter $fa_1$ to the filter $fa_9$ each having the number of channels of 3 and the intermediate layer ML3 performed a product-sum operation of the data D1 and the filter $fa_1$ to a filter $fa_3$ each having the number of channels of 9. It was assumed that in the case where the component x of the data D1 was converted into the component y with the use of the formula "y=ax+b", the intermediate layer ML1 performed a product-sum operation of the image data and the filter $fa_1$ to a filter $fa_{162}$ each having the number of channels of 3 and the intermediate layer ML3 performed a product-sum operation of the data D2 and the filter $fb_1$ to the filter $fb_3$ each having the number of channels of 162.

Figure 17:
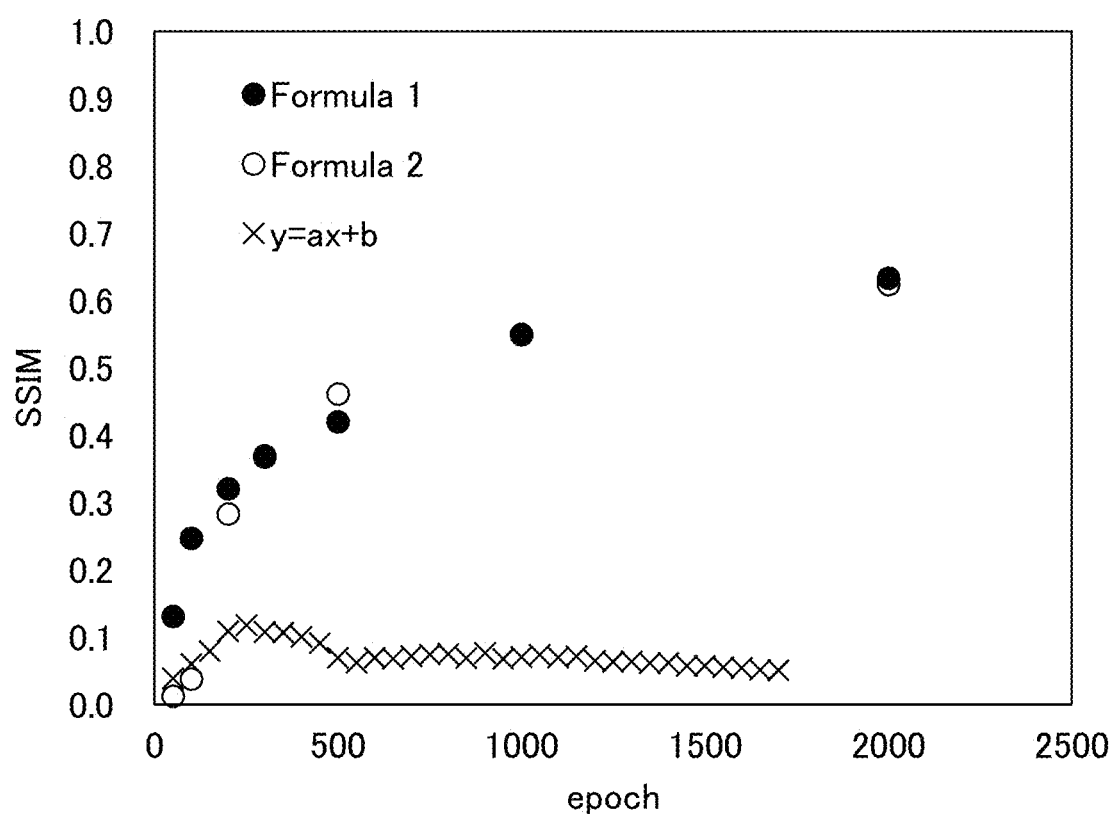
FIG. 17 is a graph showing learning results relating to Example.

FIG. 17 is a graph showing the relation between SSIM and the number of times of learning (epoch). The SSIM was calculated using test data and the correct data. A higher SSIM indicates higher similarity between the test data and the correct data, which means that the machine learning model MLM can perform inference with high accuracy. Like the learning data and the correct data, the test data was image data having a width of 1920, a height of 1200, and the number of channels of 3.

As described above, the number of filters fa and the number of channels of the filters fb were smaller in the case where the component x of the data D1 was converted into the component y with the use of Formula 1 or Formula 2 than in the case where the component x was converted into the component y with the use of the formula "y=ax+b". Nevertheless, as shown in FIG. 17, SSIM was higher in the case where the component x was converted into the component y with the use of Formula 1 or Formula 2 than in the case where the component x was converted into the component y with the use of the formula "y=ax+b", with the number of times of learning being greater than or equal to 200.

REFERENCE NUMERALS

10: image processing system, 20: display device, 21: input portion, 22: display portion, 23: machine learning processing portion, 24: pixel, 26: region, 29: region, 30: image capturing device, 33: pixel, 40: generator, 42: database, 43: image extraction portion, 44: image processing portion, 45: image generation portion, 46: learning portion, 50: bright spot correction portion, 51: bright spot, 52: region, 53: grayscale value, 54: grayscale value, 55: grayscale value, 56: line, 57: line, 57A: line, 57B: line, 61: graph, 63: graph, 63A: graph, 65: grayscale value, 126: wiring, 134: wiring, 161: transistor, 162: transistor, 170: light-emitting element, 171: transistor, 173: capacitor, 174: wiring, 175: wiring, 180: liquid crystal element, 181: capacitor, 182: wiring, 183: wiring

The invention claimed is:

1. An image processing system comprising a display device, an image capturing device, and a learning device,
wherein the display device comprises an input portion, a machine learning processing portion, and a display portion in which m rows and n columns of pixels are arranged in a matrix,
wherein the learning device comprises a database, an image processing portion, an image generation portion, and a learning portion,
wherein the database stores a table generated in accordance with first image data input to the input portion and second image data acquired by display of an image corresponding to the first image data on the display portion and image capturing by the image capturing device in a manner to include the image displayed on the display portion,
wherein the first image data comprises m rows and n columns of first grayscale values,
wherein the second image data comprises m rows and n columns of second grayscale values,
wherein the table represents the first grayscale values and the second grayscale values at coordinates corresponding to coordinates of the first grayscale values,
wherein the image processing portion is configured to perform, in accordance with a second learning image data, image processing on a first learning image data input to the input portion and thereby generating a third learning image data,
wherein the second learning image data is image data acquired by display of an image corresponding to the first learning image data on the display portion and image capturing by the image capturing device in a manner to include the image displayed on the display portion,
wherein the third learning image data comprises m rows and n columns of third grayscale values,
wherein the image generation portion is configured to generate a fourth learning image data that is image data comprising the first grayscale values corresponding to the second grayscale values selected in accordance with the third grayscale values,
wherein the learning portion is configured to generate a machine learning model using the first learning image data and the fourth learning image data,
wherein the learning portion is configured to output the machine learning model to the machine learning processing portion,
wherein the machine learning processing portion is configured to perform processing based on the machine learning model on content image data input to the input portion, and
wherein m and n are each an integer of greater than or equal to 2.

2. The image processing system according to claim 1,
wherein the first learning image data comprises m rows and n columns of fourth grayscale values,
wherein the second learning image data comprises m rows and n columns of fifth grayscale values, and
wherein the image processing portion is configured to perform the image processing in a manner to make a difference between a sum of the third grayscale values and a sum of the fifth grayscale values smaller than a difference between a sum of the fourth grayscale values and a sum of the fifth grayscale values.

3. The image processing system according to claim 1,
wherein the machine learning model is a neural network model.

4. An image processing system comprising a display device, an image capturing device, and a generator, wherein the display device comprises an input portion, a bright spot correction portion, and a display portion in which m rows and n columns of pixels are arranged in a matrix, wherein the generator comprises a database and an image generation portion, wherein the database stores a table generated in accordance with a first database image data input to the input portion and a second database image data acquired by display of an image corresponding to the first database image data on the display portion and image capturing by the image capturing device in a manner to include the image displayed on the display portion, wherein the first database image data comprises m rows and n columns of first grayscale values, wherein the second database image data comprises m rows and n columns of second grayscale values, wherein the table represents the first grayscale values and the second grayscale values at coordinates corresponding to coordinates of the first grayscale values, wherein the image capturing device is configured to perform image capturing of, when the display portion displays an image corresponding to a first bright spot correction image data input to the input portion, the image displayed on the display portion and thereby acquiring a second bright spot correction image data, wherein the second bright spot correction image data comprises m rows and n columns of third grayscale values, wherein the image generation portion is configured to generate a third bright spot correction image data that is image data comprising the first grayscale values corresponding to the second grayscale values selected in accordance with the third grayscale values, wherein the bright spot correction portion is configured to detect, as bright spot coordinates, coordinates of the first grayscale values smaller than or equal to a threshold value among m rows and n columns of the first grayscale values of the third bright spot correction image data, wherein the bright spot correction portion is configured to reduce, when content image data comprising m rows and n columns of fourth grayscale values is input to the input portion, the fourth grayscale values at coordinates that are the same as the bright spot coordinates, and wherein m and n are each an integer of greater than or equal to 2.

5. The image processing system according to claim 4, wherein the display device comprises a machine learning processing portion, wherein the generator comprises an image processing portion and a learning portion, wherein the image processing portion is configured to perform, in accordance with a second learning image data, image processing on a first learning image data input to the input portion and thereby generating a third learning image data, wherein the second learning image data is image data acquired by display of an image corresponding to the first learning image data on the display portion and image capturing by the image capturing device in a manner to include the image displayed on the display portion, wherein the third learning image data comprises m rows and n columns of fifth grayscale values, wherein the image generation portion is configured to generate a fourth learning image data that is image data comprising the first grayscale values corresponding to the second grayscale values selected in accordance with the fifth grayscale values, wherein the learning portion is configured to generate a machine learning model using the first learning image data and the fourth learning image data, wherein the learning portion is configured to output the machine learning model to the machine learning processing portion, and wherein the machine learning processing portion is configured to perform processing based on the machine learning model on the content image data input to the input portion.

6. The image processing system according to claim 5, wherein the first learning image data comprises m rows and n columns of sixth grayscale values, wherein the second learning image data comprises m rows and n columns of seventh grayscale values, and wherein the image processing portion is configured to perform the image processing in a manner to make a difference between a sum of the fifth grayscale values and a sum of the seventh grayscale values smaller than a difference between a sum of the sixth grayscale values and a sum of the seventh grayscale values.

7. The image processing system according to claim 5, wherein the machine learning model is a neural network model.

8. An image processing system comprising a display device, an image capturing device, and a generator, wherein the display device comprises an input portion, a bright spot correction portion, and a display portion in which m rows and n columns of pixels are arranged in a matrix, wherein the generator comprises a database and an image generation portion, wherein the database stores a table generated in accordance with a first database image data input to the input portion and a second database image data acquired by display of an image corresponding to the first database image data on the display portion and image capturing by the image capturing device in a manner to include the image displayed on the display portion, wherein the first database image data comprises m rows and n columns of first grayscale values, wherein the second database image data comprises m rows and n columns of second grayscale values, wherein the table represents the first grayscale values and the second grayscale values at coordinates corresponding to coordinates of the first grayscale values, wherein the image capturing device is configured to perform image capturing of, when the display portion displays an image corresponding to a first bright spot correction image data input to the input portion, the image displayed on the display portion and thereby acquiring a second bright spot correction image data, wherein the second bright spot correction image data comprises m rows and n columns of third grayscale values, wherein the image generation portion is configured to generate a third bright spot correction image data that is image data comprising the first grayscale values corresponding to the second grayscale values selected in accordance with the third grayscale values, wherein the bright spot correction portion is configured to detect, as first bright spot coordinates, coordinates of the first grayscale values smaller than or equal to a first threshold value among m rows and n columns of the first grayscale values of the third bright spot correction image data, wherein the bright spot correction portion is configured to detect, as second bright spot coordinates, coordinates of the third grayscale values larger than or equal to a second threshold value among the m rows and n columns of third grayscale values of the second bright spot correction image data, wherein the bright spot correction portion is configured to reduce, when content image data comprising m rows and n columns of fourth grayscale values is input to the input portion, the fourth grayscale values at coordinates that are the same as the first or second bright spot coordinates, and wherein m and n are each an integer of greater than or equal to 2.

9. The image processing system according to claim 8, wherein the display device comprises a machine learning processing portion, wherein the generator comprises an image processing portion and a learning portion, wherein the image processing portion is configured to perform, in accordance with a second learning image data, image processing on a first learning image data input to the input portion and thereby generating a third learning image data, wherein the second learning image data is image data acquired by display of an image corresponding to the first learning image data on the display portion and image capturing by the image capturing device in a manner to include the image displayed on the display portion, wherein the third learning image data comprises m rows and n columns of fifth grayscale values, wherein the image generation portion is configured to generate a fourth learning image data that is image data comprising the first grayscale values corresponding to the second grayscale values selected in accordance with the fifth grayscale values, wherein the learning portion is configured to generate a machine learning model using the first learning image data and the fourth learning image data, wherein the learning portion is configured to output the machine learning model to the machine learning processing portion, and wherein the machine learning processing portion is configured to perform processing based on the machine learning model on the content image data input to the input portion.

10. The image processing system according to claim 9, wherein the first learning image data comprises m rows and n columns of sixth grayscale values, wherein the second learning image data comprises m rows and n columns of seventh grayscale values, and wherein the image processing portion is configured to perform the image processing in a manner to make a difference between a sum of the fifth grayscale values and a sum of the seventh grayscale values smaller than a difference between a sum of the sixth grayscale values and a sum of the seventh grayscale values.

11. The image processing system according to claim 9, wherein the machine learning model is a neural network model.

* * * * *